US009590740B1

(12) United States Patent
Pace et al.

(10) Patent No.: US 9,590,740 B1
(45) Date of Patent: Mar. 7, 2017

(54) METHOD AND SYSTEM FOR ROBUST SYMMETRICAL NUMBER SYSTEM PHOTONIC DIRECTION FINDING

(71) Applicant: The United States of America, as represented by the Secretary of the Navy, Washington, DC (US)

(72) Inventors: Phillip E. Pace, San Juan Bautista, CA (US); Thomas W. Tedesso, Annapolis, MD (US); James Calusdian, Salinas, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/919,346

(22) Filed: Oct. 21, 2015

Related U.S. Application Data

(60) Provisional application No. 62/067,171, filed on Oct. 22, 2014.

(51) Int. Cl.
*H03M 1/00* (2006.01)
*H04B 10/04* (2006.01)
*H04B 10/54* (2013.01)
*H04B 10/50* (2013.01)

(52) U.S. Cl.
CPC ......... *H04B 10/541* (2013.01); *H04B 10/503* (2013.01)

(58) Field of Classification Search
None
See application file for complete search history.

(56) References Cited

U.S. PATENT DOCUMENTS

| 3,955,155 | A | * | 5/1976 | Behrend | .................. H03C 1/50 |
|---|---|---|---|---|---|
| | | | | | 332/151 |
| 4,277,676 | A | * | 7/1981 | Kammerer | ................ E02D 7/00 |
| | | | | | 173/20 |
| 4,479,253 | A | * | 10/1984 | Daniel, Jr. | ........... H03G 3/3052 |
| | | | | | 375/345 |
| 6,031,879 | A | | 2/2000 | Pace et al. | |

(Continued)

OTHER PUBLICATIONS

Kaur ["Application of Microwave Photonics in Electronic Warfare" IJCST Jul.-Sep. 2013].*

(Continued)

*Primary Examiner* — Oommen Jacob
(74) *Attorney, Agent, or Firm* — Naval Postgraduate School; Lisa A. Norris

(57) ABSTRACT

A four-element wideband photonic DF system with robust symmetrical number system preprocessing utilizes dual electrode Mach-Zehnder modulators (DE-MZMs) to conduct phase detection for direct wideband direction finding (DF) of RF signals, such as microwave signals, in which the normalized magnitude of the output signal phase detector circuit is equal to $|\sin(\phi/2)|$ where $\phi$ is the phase difference between the plane waves arriving at the reference and measurement antennas of a linear DF array. The method and system allow fine angular resolution using a much smaller array size than is typically required for linear arrays employing super-resolution signal processing techniques.

7 Claims, 21 Drawing Sheets

(20 of 21 Drawing Sheet(s) Filed in Color)

(56) References Cited

U.S. PATENT DOCUMENTS

| | | | | |
|---|---|---|---|---|
| 7,471,224 B2* | 12/2008 | Babbitt | ............... | G01J 9/04 341/133 |
| 8,269,658 B1* | 9/2012 | Pace | ............... | H04B 10/556 341/137 |
| 2007/0189778 A1* | 8/2007 | Burns | ............... | H01P 1/32 398/183 |
| 2009/0027271 A1* | 1/2009 | Banker | ............... | G01S 1/20 342/387 |
| 2012/0028594 A1* | 2/2012 | Rao | ............... | H03D 3/009 455/207 |
| 2012/0071125 A1* | 3/2012 | Eken | ............... | G01R 19/04 455/226.2 |
| 2012/0140236 A1* | 6/2012 | Babbitt | ............... | G01S 3/46 356/451 |
| 2013/0340512 A1* | 12/2013 | Horlbeck | ............... | F02D 41/1497 73/114.02 |

OTHER PUBLICATIONS

Mohan ["Broadband Multi-Emitter Signal Analysis and Direction Finding Using a Dual-Port Interferometric Photonic Spectrum Analyzer based on Spatial-Spectral Materials" IEEE 2013].*

Pace ["High-Resolution Phase Sampled Interferometry Using Symmetrical Number Systems" IEEE Transactions on Antennas and Propagation, vol. 49, No. 10, Oct. 2001].*

Benveniste ["Design and Development of a Single Channel RSNS Direction Finder" Naval Post Graduate school, Mar. 2009].*

Pace, P.E., Styer, D., and Akin, I.A., "A Folding ADC Employing a Robust Symmetrical Number System with Gray-Code Properties," Proceedings of the 1998 IEEE International Symposium on Circuits and Systems, 1998. ISCAS '98, vol. 1, May 31-Jun. 3, 1998, pp. 397-400.

Pace, P.E., Styer, D., and Akin, I.A.,"A Folding ADC Preprocessing Architecture Employing a Robust Symmetrical Number System With Gray-Code Properties," IEEE Transactions on Circuits and Systems II: Analog and Digital Signal Processing, vol. 47, No. 5, May 2000, pp. 462-467.

Pace, P.E., Styer, D., and Akin, I.A.,"A Folding ADC Preprocessing Architecture Employing a Robust Symmetrical Number System With Gray-Code Properties," IEEE Transactions on Circuits and Systems II: Analog and Digital Signal Processing, vol. 47, No. 5, May 2000, pp. 462-467.

Luke, B.L. and Pace, P.E., "N-Sequence RSNS Ambiguity Analysis," IEEE Transactions on Information Theory, vol. 53, No. 5, May 2007, pp. 1759-1766.

Luke, B.L. and Pace, P.E., "RSNS-to-binary Conversion," IEEE Transactions on Circuits and Systems I: Regular Papers, vol. 54, No. 9, Sep. 2007, pp. 2030-2043.

Tedesso, Thomas W., "Use of Symmetrical Number Systems in Electronic Warfare," Naval Postgraduate School Dissertation, Dec. 2013, pp. 1-229.

* cited by examiner

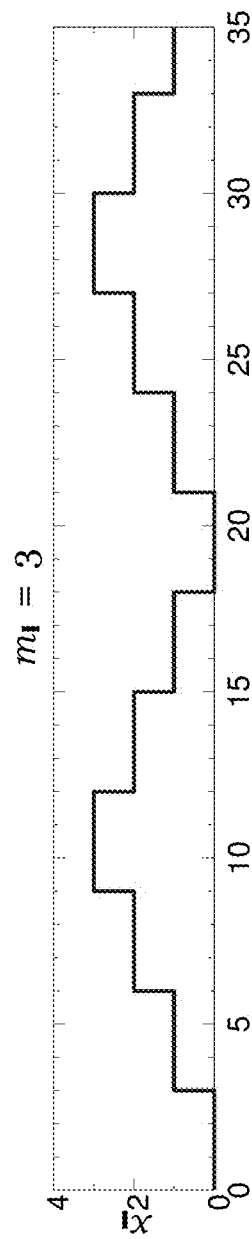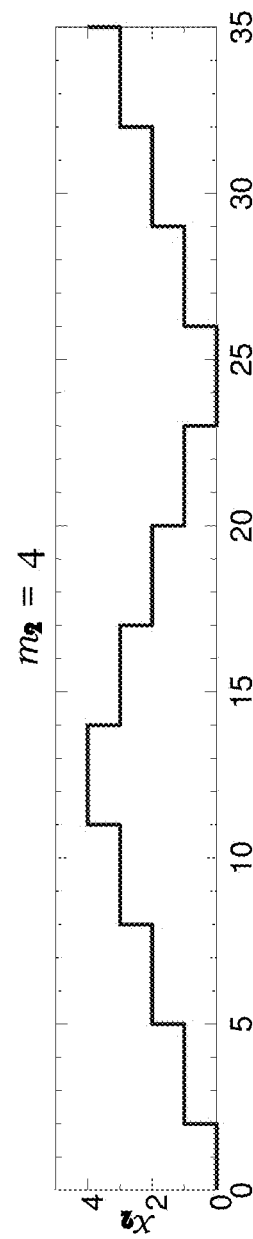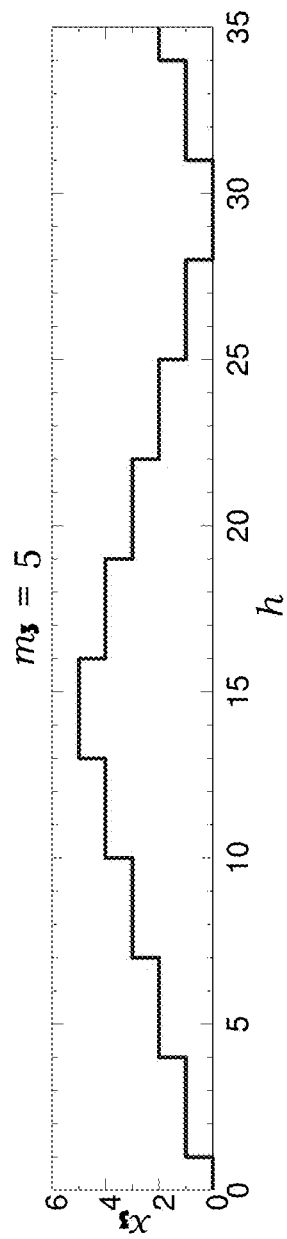

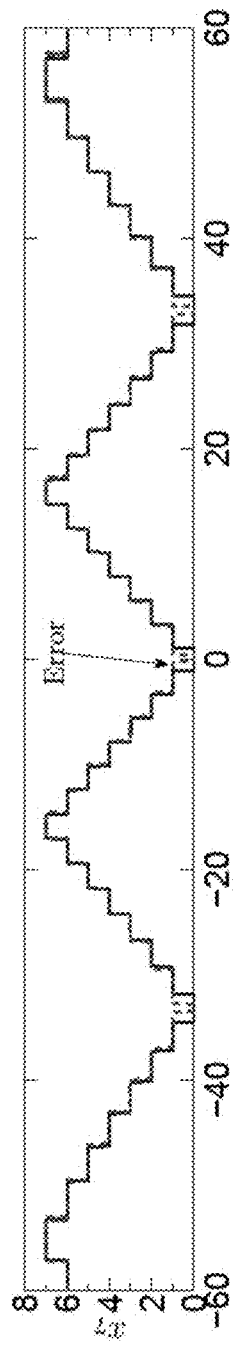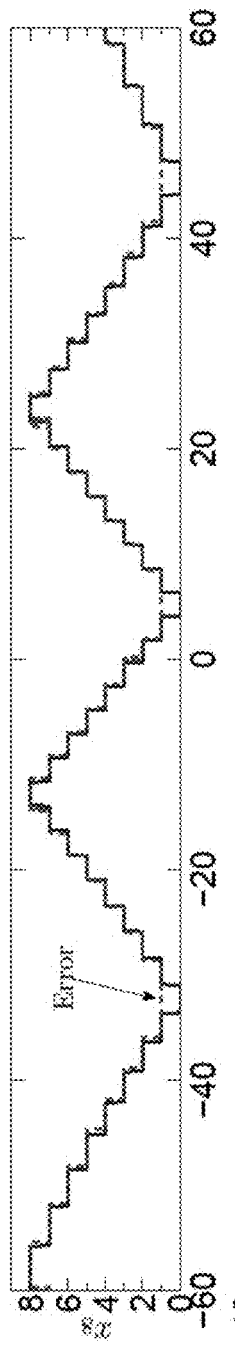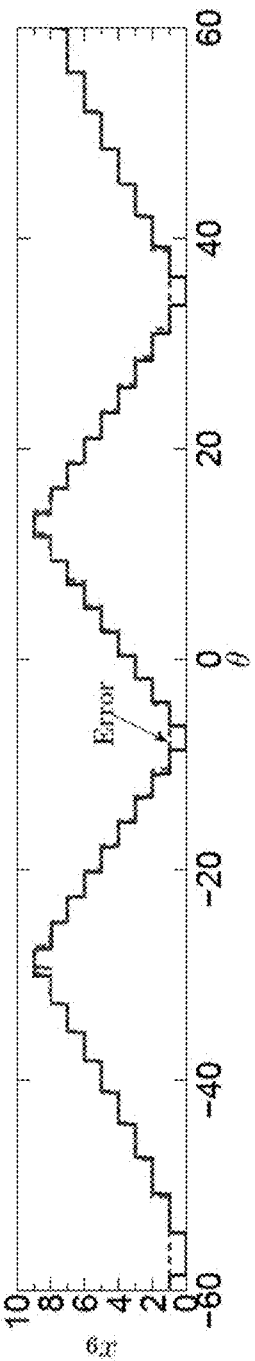

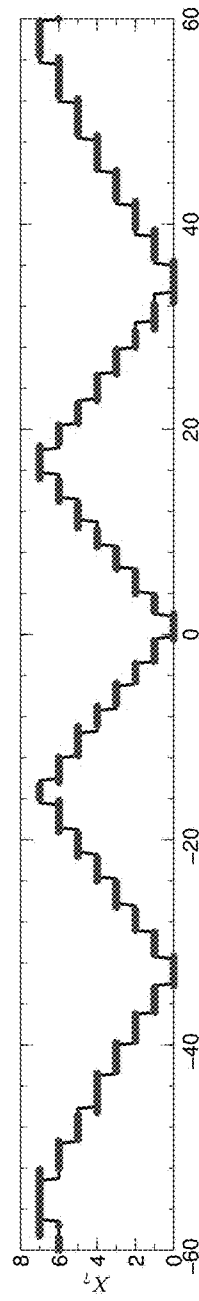
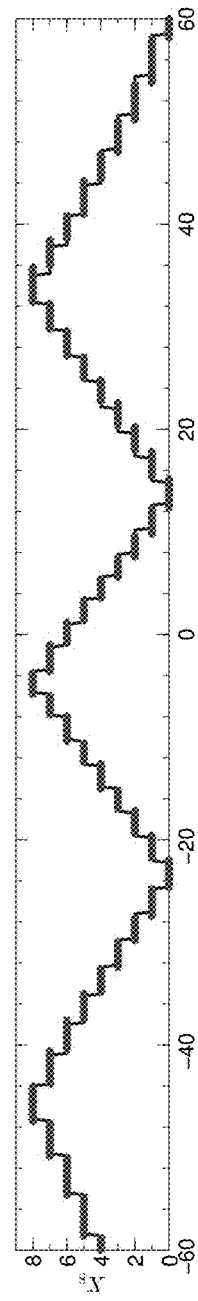
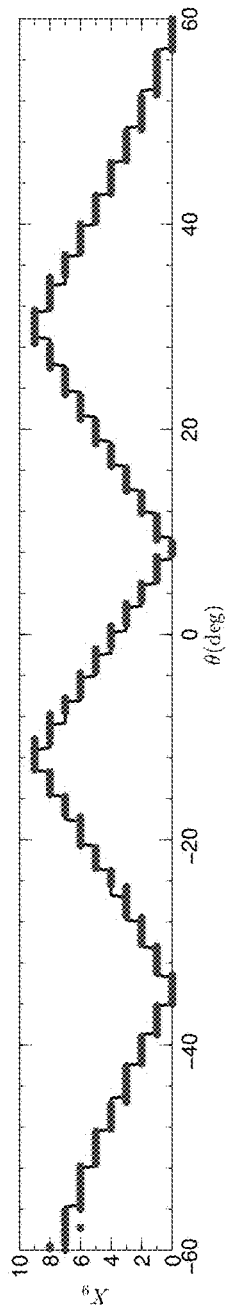
FIG. 10A
FIG. 10B
FIG. 10C

METHOD AND SYSTEM FOR ROBUST SYMMETRICAL NUMBER SYSTEM PHOTONIC DIRECTION FINDING

CROSS-REFERENCE TO RELATED PATENT APPLICATIONS

This application is a non-provisional application of and claims priority to U.S. Patent Application 62/067,171, filed on Oct. 22, 2014, which is hereby incorporated by reference in its entirety.

BACKGROUND OF THE INVENTION

1. Field of the Invention

The present invention relates generally to direction finding systems for transmitted signals.

2. Description of the Related Art

The use of photonic devices in microwave circuits has become more prevalent due to their wide bandwidths, the low attenuation losses associated with fiber-optic cables, immunity to electromagnetic interference, and the ability to implement "true time" delay lines. The revolution in microwave photonics has rendered new techniques for generating microwave (MW) signals, photonic signal processing including microwave delay line filters for beam forming applications and photonic analog-to-digital converters (ADCs). Wideband optical technology also plays a significant role in many direction finding (DF) and digital receiver architectures.

Especially important in DF applications is the use of the Mach-Zehnder modulator (MZM) built using LiNbO3 technology. In a wideband fiber-optic DF application, a MZM is used as an optical down conversion circuit at the antenna and as a means to efficiently couple the local oscillator into the optical domain. Accuracy better than 0.1 deg is achieved at 10 GHz with a bandwidth capability of 2-18 GHz.

Another photonic DF application uses optical Bragg cells. A laser is split between two Bragg cells whose outputs are Fourier transformed by a lens and detected by a channelized phase detector. An alternate approach to measuring the direction of arrival (DOA) for a radio frequency (RF) signal uses two cascaded MZMs biased at the minimum transmission point to suppress the optical carrier wave. Identical RF signals with a given phase shift are applied to the electrode of each MZM. The phase difference between the signals is determined by measuring the optical signal's power.

Another technique for detecting the DOA of broadband microwave (MW) signals in phased-array antennas is based upon a two-tap photonic transversal MW filter and measuring the frequency of the notches produced over the broadband signal using a spectrum analyzer. A recent technique utilizes a broadband, multi-emitter DF system with a dual-drive Mach-Zehnder modulator and a spatial-spectral (S2) material based spectrum analyzer that provides fine angular and spectral resolution for spectrally non-overlapping signals.

SUMMARY OF THE INVENTION

Embodiments in accordance with the invention include a method and system for robust symmetrical number system (RSNS) photonic direction finding. In accordance with one embodiment, a four-element wideband photonic DF system with robust symmetrical number system preprocessing utilizes dual electrode Mach-Zehnder modulators (DE-MZMs) to conduct phase detection for direct wideband direction finding (DF) of microwave signals in which the normalized magnitude of the output signal phase detector circuit is equal to $|\sin(\phi/2)|$ where $\phi$ is the phase difference between the plane waves arriving at the reference and measurement antennas of the linear DF array. The method and system allow fine angular resolution using a much smaller array size than is typically required for linear arrays employing super-resolution signal processing techniques.

Embodiments in accordance with the invention are best understood by reference to the following detailed description when read in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-1C illustrate examples of the folding waveforms of a three-sequence, left-shifted robust symmetrical number system (RSNS) with $m_i=\{3, 4, 5\}$ and $s_i=\{0, 1, 2\}$.

FIGS. 6A-6F illustrate a comparison of folding waveforms for each channel at a design of f=6 GHz compared to those resulting from an incident wavefront at f=8 GHz in which the RSNS folding waveforms are plotted normalized by the modulus value to demonstrate the alignment of the waveforms in accordance with one embodiment

FIGS. 10A-10C illustrate theoretical residues versus experimental residues in accordance with one embodiment.

Embodiments in accordance with the invention are further described herein with reference to the drawings.

DETAILED DESCRIPTION OF THE INVENTION

Embodiments in accordance with the invention include a method and system for robust symmetrical number system (RSNS) photonic direction finding (DF). In one embodiment, a four-element photonic RSNS-based DF array system utilizes dual electrode Mach-Zehnder modulators (DE-MZMs) in phase detection and RSNS preprocessing that provides a small baseline DF array with fine angular resolution over a large field-of-view (FOV). Embodiments in accordance with the invention have applicability in phase detection for direct wideband direction finding (DF) of microwave signals.

Figure 4:
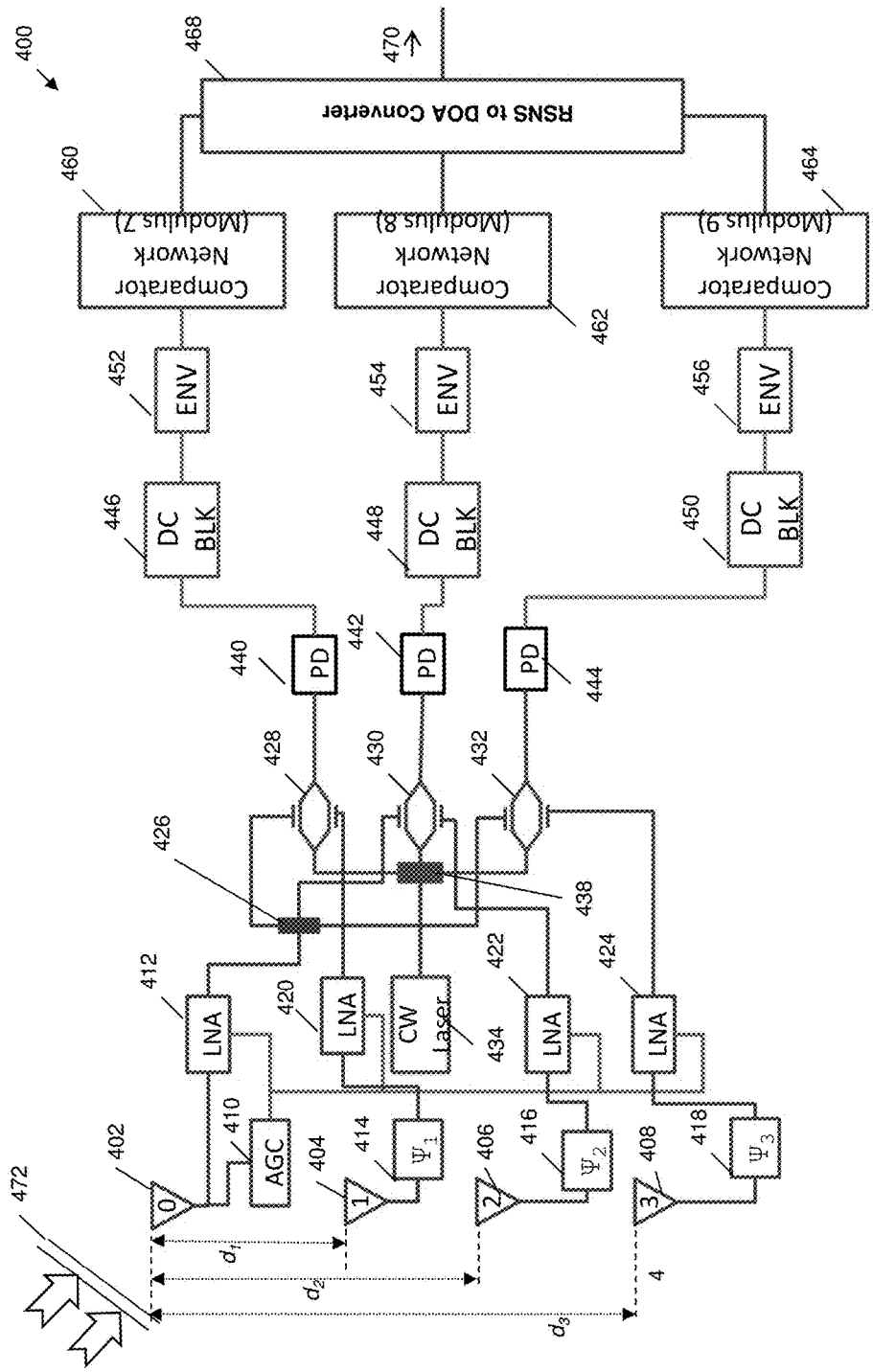
FIG. 4 illustrates a block diagram of a system for robust symmetrical number system (RSNS) photonic direction finding (DF) in accordance with one embodiment.

Referring generally to FIG. 4, a four-element wideband DF array system with RSNS preprocessing 400 utilizes DE-MZMs to modulate the intensity of a continuous wave (CW) laser to generate a signal that is a function of the difference between the phase shifted signals applied to the electrodes of the DE-MZMs. The modulated optical signal is converted back to an electrical signal by a photodetector and is passed through a direct current (DC) blocking capacitor leaving a sinusoidal signal whose magnitude is a function of the phase difference $\psi_i$ between the RF signals applied to the DE-MZM electrodes. The magnitude of the signal in each channel is determined through envelope detection and the normalized envelope is applied to separate comparator networks to generate the RSNS residues used in decoding the direction of arrival (DOA) of the received signal. The use of DE-MZMs provides wideband DF capability without having to down convert a high frequency input signal, for example a 10 GHz pulsed radar signal, to an intermediate frequency. The use of RSNS preprocessing obtains an unambiguous DOA with fine spatial resolution while maintaining a smaller array size than conventional linear arrays. Details of embodiments of the invention and FIG. 4 are further described herein.

The RSNS is a modular based number system designed to extract the maximum information from symmetrical folding waveforms. Employing a set of co-prime moduli $m_i = \{m_1, m_2, \ldots, m_N\}$, the RSNS represents an integer h as a N-tuple of symmetrical residues from each channel, $$X_h = [x_{1,h}, x_{2,h}, \ldots, x_{N,h}]^T \quad (1)$$

where N≥2. Each sequence forms a periodic folding staircase wave form composed of the residues and the modulus with each value repeated N times:

$$\{x_h\} = [0, \ldots, 0, 1, 1 \ldots 1, \ldots, m_i-1, \ldots, m_i-1, m_i, \ldots m_i, m_i-1, \ldots, m_i-1, \ldots, 1, \ldots 1]. \quad (2)$$

Each sequence is shifted left or right by $s_i = i-1$ where $i \in \{1, 2, \ldots, N\}$. The shift values $s_i$ form a complete residue system modulo N. For any coprime moduli $m_i$, the RSNS sequence is defined as $$x_h = \begin{cases} \left\lfloor \dfrac{h - s_i}{N} \right\rfloor, & s_i \leq h \leq Nm_i + s_i + 1 \\ \left\lfloor \dfrac{2Nm_i + N - h + s_i - 1}{N} \right\rfloor, & Nm_i + s_i + 2 \leq h \leq 2Nm_i + s_i - 1 \end{cases} \quad (3)$$

where $\lfloor \cdot \rfloor$ is the floor function. Each RSNS sequence is periodic with a period equal to $2 N_{mi}$, such that $x_{h+2Nm_i} = x_h$. The N-sequence RSNS is also periodic with a fundamental period of $$P_f = 2N \prod_{i=1}^{N} m_i. \quad (4)$$

An example of a three-sequence, left-shifted RSNS with $m_i = \{3, 4, 5\}$ and $s_i = \{0, 1, 2\}$ is shown in Table 1 and FIGS. 1A-1C.

TABLE 1

Three-sequence RSNS structure for $m_i = \{3, 4, 5,\}$, N = 3.

| h | 0 | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|----|----|----|----|----|----|----|-----|
| $X_h$ | | | | | | | | | | | | | | | | | | |
| $m_1 = 3$ | 0 | 0 | 0 | 1 | 1 | 1 | 2 | 2 | 2 | 3 | 3 | 3 | 2 | 2 | 2 | 1 | 1 | ... |
| $m_2 = 4$ | 0 | 0 | 1 | 1 | 1 | 2 | 2 | 2 | 3 | 3 | 3 | 4 | 4 | 4 | 3 | 3 | 3 | ... |
| $m_3 = 5$ | 0 | 1 | 1 | 1 | 2 | 2 | 2 | 3 | 3 | 3 | 4 | 4 | 4 | 5 | 5 | 5 | 4 | ... |

Examining Table 1 and FIGS. 1A-1C, only one subsequence changes value by ±1 at each increment of the code value h demonstrating that the RSNS has an integer Gray code property. This integer Gray code property makes the RSNS particularly well suited for DF antenna arrays and error control applications.

The dynamic range $\hat{M}$ of the RSNS is the longest run of distinct N-tuples. However, unlike other residue based number systems, the values comprising the dynamic range do not begin at zero and end at $\hat{M}-1$. The dynamic range and the starting and stopping points that comprise the sequence of unambiguous N-tuples $X_h$ are determined through the use of ambiguity analysis algorithms. A general closed-form expression for $\hat{M}$ has not be determined; however, closed-form expressions for $\hat{M}$ exist for some specific moduli combinations. For a two-sequence RSNS, the closed-form expression for $\hat{M}$ is $$\hat{M} = 6m_1 - 3, \text{ and } m_2 = m_1 + 1 \text{ when } m_i \geq 3 \quad (5)$$

$$\hat{M} = \begin{cases} 4m_1 + 2m_2 - 5, & \text{when } m_2 \le m_1 + 2 \\ 4m_1 + 2m_2 - 2, & \text{when } m_2 \ge m_1 + 3 \end{cases} \quad (6)$$

and $5 \le m_i < m_2$. A closed form expression for $\hat{M}$ for a three-sequence RSNS is $$\hat{M} = \frac{3}{2}m^2 + \frac{15}{2}m + 7 \quad (7)$$

where the moduli are $m_i = \{m, m+1, m+2\}$ with $m \ge 3$ and odd. Several additional closed-form expressions for $\hat{M}$ for other specific families of moduli sets have also been developed.

Figure 2:
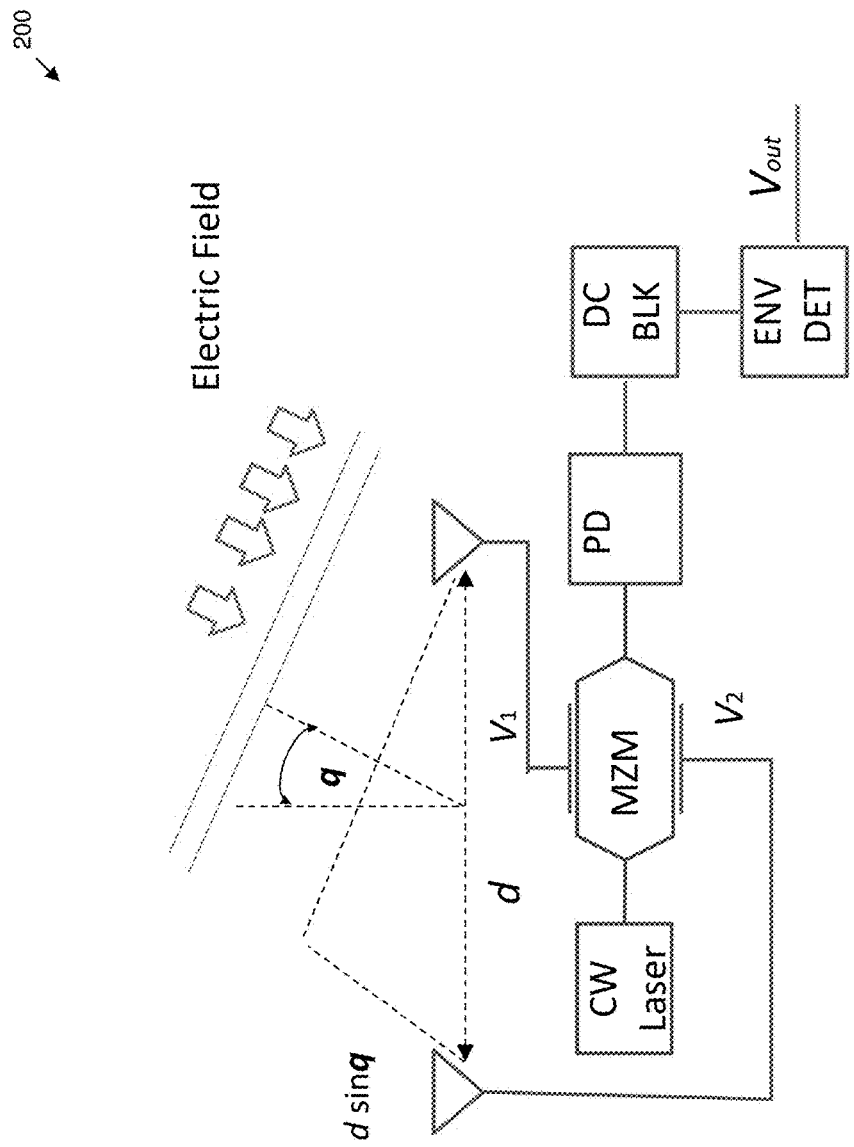
FIG. 2 illustrates a block diagram of a two-element photonic DF linear array in accordance with one embodiment.

FIG. 2 illustrates a block diagram of a two-element photonic DF linear array 200 in accordance with one embodiment. For the two-element photonic DF linear array 200 shown in FIG. 2, the DOA of a RF emitter can be determined by detecting the phase difference between the narrow band signals received at a reference antenna element and a measurement antenna element separated by a distance d. The phase angle $\psi$ between the signals arriving at the two antennas is related to the DOA $\theta$ by $$\psi = \frac{2\pi}{\lambda} d \sin\theta, \quad (8)$$

where $\lambda$ is the wavelength of the incident RF wave. If the signal at the reference antenna element is $V_1(t) = A \cos(\Omega t)$ and the signal at the measurement antenna element is $V_2(t) = A \cos(\Omega t - \psi)$, $\psi$ can be determined by a phase detector, and is calculated by solving (8) for $\theta$, $$\theta = \arcsin\left(\frac{\psi \lambda}{2\pi d}\right). \quad (9)$$

To prevent ambiguous DOA results, $d \le \lambda/2$ for a field-of-view (FOV) of 180 degrees. If the FOV is reduced, the maximum distance between antenna elements can be increased by a scaling factor $\xi = 1/\sin(\text{FOV}/2)$. In FIG. 2, the DC component of the PD output is blocked, and the magnitude of the AC component is determined from the output of an envelope detector. The normalized output voltage of the envelope detector $V_{out}$ is demonstrated below to be a function of the phase angle.

The transmission factor T of a DE-MZM is a function of the difference between the voltages $V_1$ and $V_2$ applied to its electrodes and is expressed as $$T = \frac{1}{2}\left[1 + \cos\left(\frac{V_1 - V_2}{V_\pi}\pi + \varphi_b\right)\right] \quad (10)$$

where $$\varphi_b = 2\pi \frac{\Delta_{nL}}{\lambda} + \pi \frac{V_b}{V_\pi} \quad (11)$$

is the phase bias, $V_\pi$ is the half-wave switching voltage of the DE-MZM, and $\Delta_{nL} = n_2 L_2 - n_1 L_1$ is the path length mismatch between the two arms of the interferometers. If equal amplitude phase shifted sinusoids, $V_1 = V \cos(\Omega t)$ and $V_2 = V \cos(\Omega t - \psi)$, are applied to the electrodes of the DE-MZM, the difference term in (10) is $$V_1 - V_2 = 2V \sin(\psi/2) \sin(\Omega t + \psi/2). \quad (12)$$

Substituting (12) into (10) results in $$T = \frac{1}{2}\left[1 + \cos\left(\underbrace{\frac{2V \sin\frac{\psi}{2}}{V_\pi}\pi}_{x} \underbrace{\sin\left(\Omega t + \frac{\psi}{2}\right)}_{} + \underbrace{\varphi_b}_{y}\right)\right]. \quad (13)$$

By applying the identity, $$\cos(x+y) = \cos x \cos y - \sin x \sin y, \quad (14)$$

to (13), the transmission factor becomes $$T = \frac{1}{2}\left[1 + \cos\varphi_b \cos\left(z \sin\left(\Omega t + \frac{\psi}{2}\right)\right) - \sin\varphi_b \sin\left(z \sin\left(\Omega t + \frac{\psi}{2}\right)\right)\right], \quad (15)$$

where $$z = \frac{2V \sin\frac{\psi}{2}}{V_\pi}\pi. \quad (16)$$

The result in (15) can be expressed as a summation of the harmonics of the input signal by applying the identities, $$\cos(z \sin\theta) = J_0(z) + 2\sum_{1}^{\infty} J_{2k}(z) \cos(2k\theta) \quad (17)$$

and $$\sin(z \sin\theta) = 2\sum_{0}^{\infty} J_{2k+1}(z) \sin((2k+1)\theta), \quad (18)$$

to (15) resulting in $$T = \frac{1}{2} + \frac{1}{2}\cos\varphi_b\left(J_0(z) + 2\sum_{k=1}^{\infty} J_{2k}(z)\cos\left(2k \sin\left(\Omega t + \frac{\psi}{2}\right)\right)\right) - \sin\varphi_b \sum_{k=0}^{\infty} J_{2k+1}(z)\sin\left((2k+1)\left(\Omega t + \frac{\psi}{2}\right)\right). \quad (19)$$

where $J_\nu(z)$ is the Bessel function of the first kind of order $\nu$.

If the DE-MZM is biased at its quadrature point ($V_b = \psi_\pi/2$), then $\phi_b \approx \pi/2$ and the even numbered harmonics in (19) are suppressed. As a result (19) simplifies to $$T = \frac{1}{2} - \sum_{k=0}^{\infty} J_{2k+1}(z)\sin\left((2k+1)\left(\Omega t + \frac{\psi}{2}\right)\right). \quad (20)$$

Therefore, the output of the PD consists of a DC component plus a summation of the odd harmonics of the RF signal. The amplitudes of the sinusoidal components are a function $\sin(\psi/2)$. If $V \ll V_\pi$, z is small and $J_1(z) \gg J_{2k+1}(z)$ where $k=1, 2 \ldots \infty$. As a result, the magnitude of the AC component of the modulated signal may be approximated as $|J_1(z)|$. When the argument, z is small, the Bessel function may be approximated as, $$J_v(z) \approx (0.5z)^v / \Gamma(v+1), \quad (21)$$

where $\Gamma(v)$ is the Gamma function. Applying (21), the normalized value of $|J_1(z)|$ can be approximated as $|\sin(\psi/2)|$ when $V \ll V_\pi$. Therefore, the normalized value of $V_{out}$ can be approximated as $$V_i = \frac{V_{out}}{\max(V_{out})} \approx |\sin(\psi/2)| \quad (22)$$

and can be used to determine $\theta$ from (8).

Figure 3:
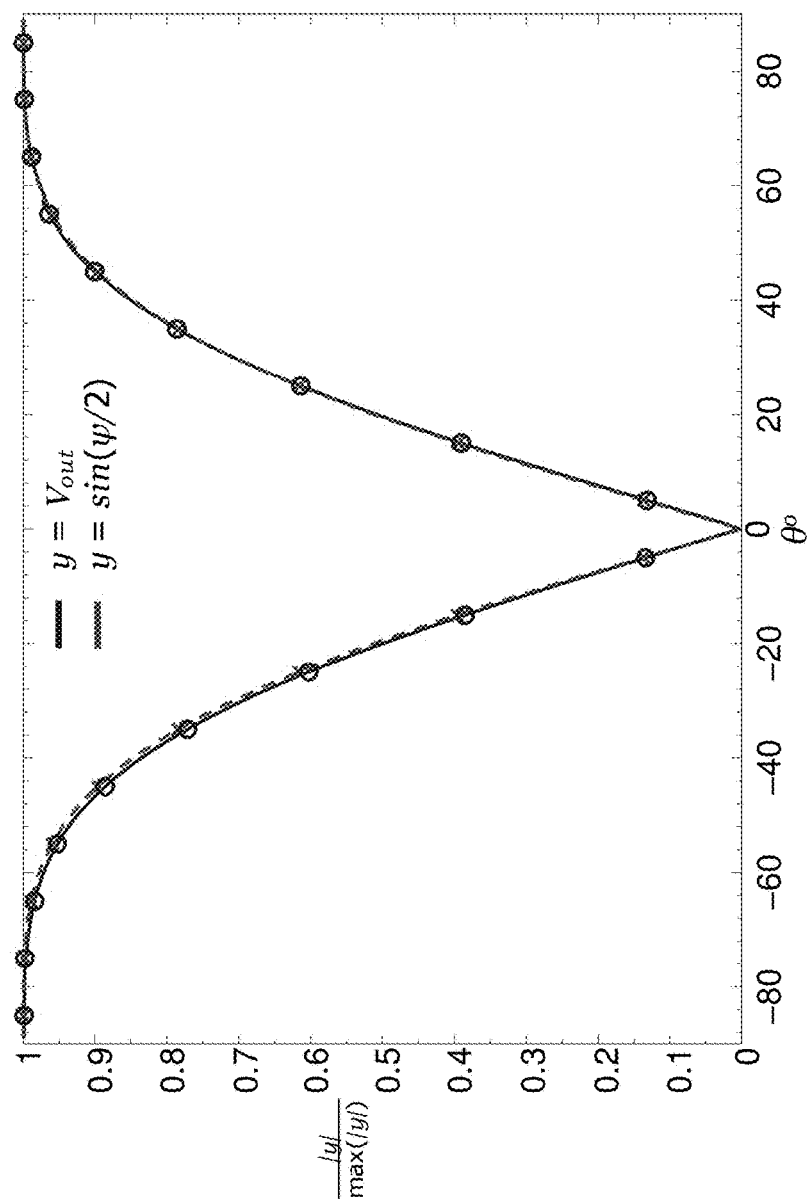
FIG. 3 illustrates $V_{out}/\max(V_{out})$ vs. DOA ($\theta$ deg) for DE-MZM biased at quadrature point, $V_b=V_\pi/2$.

To demonstrate the theoretical development presented in (10) through (22), RSoft Design Group's OPTSIM software package (available from Synopsis Optical Solutions Group) was used to simulate the two element photonic DF array (FIG. 2) with $d=\lambda/2$ through the PD output using ideal components in a noise-free environment. The simulation was conducted for $-90$ degrees $\leq \theta \leq 90$ degrees in one degree increments. In FIG. 3, the results of the simulation are plotted against $|\sin(\psi/2)|$ demonstrating the use of a DE-MZM as a phase detector. The simulation results and the theoretical approximation are approximately equal.

FIG. 4 illustrates a block diagram of a photonic DF antenna array system 400 using robust symmetrical number system preprocessing in accordance with one embodiment. Referring to FIG. 4, in one embodiment, RSNS photonic DF system 400 includes a reference antenna 402, and three measurement antennae elements 404, 406, and 408. Reference antenna 402 receives an input radio frequency (RF) signal, such as RF signal 472. Identical phase shifted RF signals of RF signal 472, are received at each measurement antenna element 404, 406, 408, respectively, a first RF signal, a second RF signal, and a third RF signal.

In one embodiment, measurement antenna elements 404, 406, 408 are arrayed at separate distances from reference antenna 402. The distance of each measurement element antenna from reference antenna 472 is based on the RSNS moduli and the number of folds within the dynamic range $\hat{M}$. For a given modulus $m_i$, the number of folds within $\hat{M}$ is $$n_i = \frac{\hat{M}}{2m_i N}, \quad (23)$$

and the distance $d_i$, between each measurement element and the reference element is equal to $$d_i = \frac{\hat{M}\lambda}{4m_i N} \xi. \quad (24)$$

First measurement antenna element 404 is located a distance $d_1$ from reference antenna 402, second measurement antenna element 406 is located a distance $d_2$ from reference antenna 402, and third measurement antenna element 408 is located a distance $d_3$ from reference antenna 402.

In one embodiment, reference antenna 402 is connected to a first input to a first low noise amplifier (LNA) 412, and to an input to an automatic gain control module (AGC) 410. Input RF signal 472 is output from reference antenna 402 to both the first input to first LNA 412 and the input to AGC 410. AGC 410 applies automatic gain control to the input signal to generate a controlled signal amplitude output, also termed herein an AGC modified RF signal. Automatic gain control is well known to those of skill in the art and not further detailed herein. The output signal of AGC 410 is input to a second input to each of first LNA 412, a second LNA 420, a third LNA 422, and a fourth LNA 424.

First measurement antenna element 404 is connected to an input to a first phase shifter 414 which shifts the phase of the first RF signal by $\psi_1$ to generate a first phase shifted signal. In one embodiment the first RF signal is shifted in phase by first phase shifter 414 to align the folding wave forms generated by the array with RSNS sequences used in coding and quantizing the direction of arrival (DOA). The first phase shifted signal is output from first phase shifter 414 to a first input to second LNA 420.

Second measurement antenna element 406 is connected to an input to a second phase shifter 416 which shifts the phase of the second RF signal by $\psi_2$ to generate a second phase shifted signal. In one embodiment the second RF signal is shifted in phase by second phase shifter 416 to align the folding wave forms generated by the array with RSNS sequences used in coding and quantizing the direction of arrival (DOA). The second phase shifted signal is output from second phase shifter 416 to a first input to third LNA 422.

Third measurement antenna element 408 is connected to an input to a third phase shifter 418 which shifts the phase of the third RF signal by $\psi_3$ to generate a third phase shifted signal. In one embodiment the third RF signal is shifted in phase by third phase shifter 418 to align the folding wave forms generated by the array with RSNS sequences used in coding and quantizing the direction of arrival (DOA). The third phase shifted signal is output from third phase shifter 418 to a first input to a fourth LNA 424. Table 2 lists an example of phase shifts applied to signals received at each measurement antenna element.

First LNA 412 amplifies the RF signal to generate an amplified RF signal. Low noise amplifiers are well known to those of skill in the art and not further detailed herein. The output signal of first LNA 412 is connected to a splitter 426 which splits the output signal from first LNA 412 into three separate output signals—a first output signal, a second output signal, and a third output signal. Signal splitters are well known to those of skill in the art and not further detailed herein. Splitter 426 has three outputs which are separately connected to a first electrode input to each of a first dual electrode Mach-Zehnder modulator (DE-MZM) 428, a second DE-MZM 430, and a third DE-MZM 432.

Second LNA 420 amplifies the first phase shifted signal to generate an amplified first phase shifted signal which is output from LNA 420 a second electrode input to DE-MZM 428. Third LNA 422 amplifies the second phase shifted signal to generate an amplified second phase shifted signal which is output from LNA 422 to a second electrode input to DE-MZM 430. Fourth LNA 424 amplifies the third phase shifted signal to generate an amplified third phase shifted signal which is output from LNA 424 connected to a second electrode input to DE-MZM 432.

A continuous wave (CW) laser 434, such as a 1550 nm CW laser source, is used to generate an optical signal which is output from CW laser 434 to an input to a 3:1 optical splitter 438. 3:1 optical splitters are well known to those of skill in the art and not further detailed herein. Optical splitter 438 splits the optical signal into three separate optical signals—a first optical signal, a second optical signal, and a third optical signal, and outputs the three optical signals separately to an optical input, such as a wave guide input, of an associated DE-MZM. In one embodiment, the first optical signal is input to the optical input of first DE-MZM 428, the second optical signal is input to the optical input of second DE-MZM 430, and the third optical signal is input to the optical input to third DE-MZM 432. As further described below, in the present invention, DE-MZMs 428, 430, and 432 are utilized as phase detectors.

First DE-MZM 428 modulates the amplitude of the first optical signal to generate a first modulated optical signal that is a function of the phase difference between the amplified RF signal applied to the first electrode and the amplified first phase shifted RF signal applied to the second electrode. The first modulated optical signal is output from DE-MZM 428 to an input to a first photodetector (PD) 440. In first PD 440, the first modulated optical signal is converted to a first electrical signal which includes a DC component.

Second DE-MZM 430 modulates the amplitude of the second optical signal to generate a second modulated optical signal that is a function of the phase difference between the amplified RF signal applied to the first electrode and the amplified second phase shifted RF signal applied to the second electrode. The second modulated optical signal is output from DE-MZM 430 to an input to a second PD 442. In second PD 442, the second modulated optical signal is converted to a second electrical signal which includes a DC component.

Third DE-MZM 432 modulates the amplitude of the third optical signal to generate a third modulated optical signal that is a function of the phase difference between the amplified RF signal applied to the first electrode and the amplified third phase shifted RF signal applied to the second electrode. The third modulated optical signal is output from DE-MZM 432 to an input to a third PD 444. In third PD 444, the third modulated optical signal is converted to a third electrical signal which includes a DC component.

The output signal of first PD 440 is connected to an input to a first direct current blocking capacitor (DC BLK) 446. DC blocking capacitors are well known to those of skill in the art and not further described herein. DC BLK 446 blocks the DC component present in the first electrical signal to produce a first sinusoidal signal whose magnitude is a function of the phase difference detected in DE-MZM 428. The first sinusoidal signal is input to a first envelope detection and normalizing module (ENV) 452.

The output of second PD 442 is connected to an input to a second DC BLK 448. DC BLK 448 blocks the DC component present in the second electrical signal to produce a second sinusoidal signal whose magnitude is a function of the phase difference detected in DE-MZM 430. The second sinusoidal signal is input to a second envelope detection and normalizing module (ENV) 454.

The output of third PD 444 is connected to an input to a third DC BLK 450. DC BLK 450 removes the DC component present in the third electrical signal to produce a third sinusoidal signal whose magnitude is a function of the phase difference detected in DE-MZM 432. The third sinusoidal signal is input to a third envelope detection and normalizing module (ENV) 456. Envelope detection and normalizing modules are well known to those of skill in the art and not further detailed herein.

First ENV 452 determines the magnitude of the first sinusoidal signal and outputs a first magnitude signal, such as a normalized voltage, to an input to a first comparator network 460. Second ENV 454 determines the magnitude of the second sinusoidal signal and outputs a second magnitude signal, such as a normalized voltage, to an input to a second comparator network 462. Third ENV 456 determines the magnitude of the third sinusoidal signal and outputs a third magnitude signal, such as a normalized voltage, to an input to a third comparator network 464.

In one embodiment, a right-shifted RSNS with $m_i=\{7,8,9\}$ and $\hat{M}=133$ is used to represent $-60$ degrees$\leq\theta\leq60$ degrees at the design frequency $f_{max}$. The RSNS folding sequences are plotted against the DOA in FIGS. 5A-5C. Each RSNS channel's residue values are determined by applying the normalized envelope detector output voltage $V_1$ to a comparator network where the comparator reference values are $$V_{j,m_i} = \sin\left(\frac{2j-1}{4m_i}\pi\right), \qquad (25)$$

where $j=1, 2, \ldots m_i$. The RSNS represents the continuous DOA by sorting the DOA into $\hat{M}$ discrete DOA bins where the DOA bin center is $\hat{\theta}_k$ $$\hat{\theta}_k = \arcsin\left(\frac{2k+1}{\xi\hat{M}} - \frac{1}{\xi}\right), \qquad (26)$$

and the bin width $r_k$ is $$r_k = \arcsin\left(\frac{2k-\hat{M}+2}{\xi\hat{M}}\right) - \arcsin\left(\frac{2k-\hat{M}}{\xi\hat{M}}\right). \qquad (27)$$

Figure 5A:
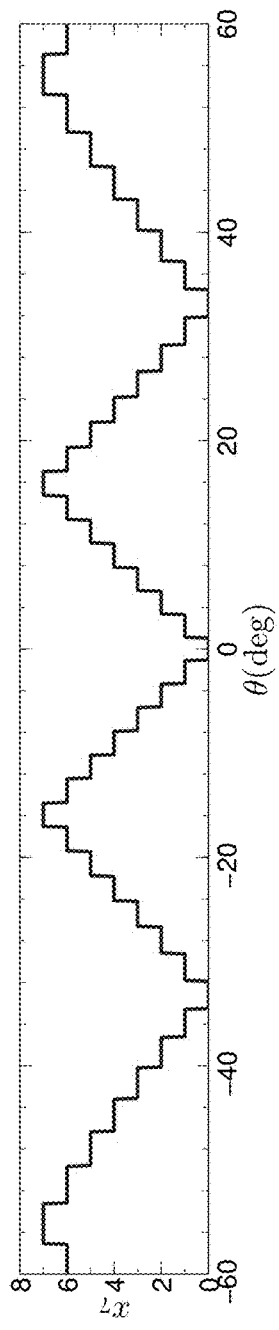
FIGS. 5A-5C illustrate robust symmetrical number system residues versus direction of arrival, $\theta$(deg) in accordance with one embodiment.
Figure 5B:
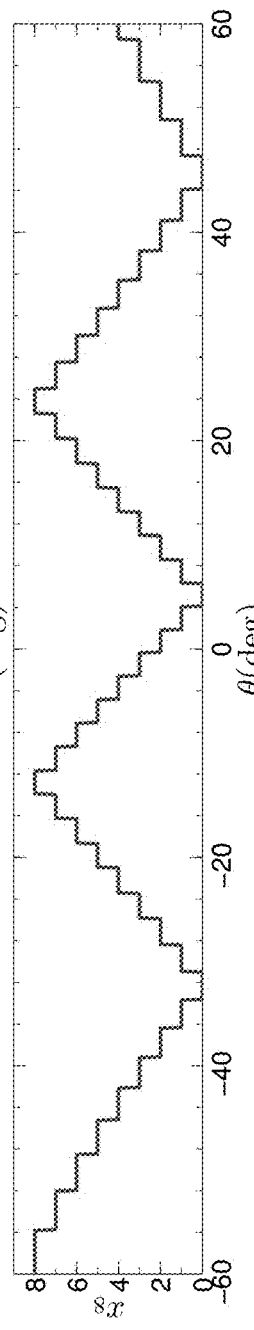
Figure 5C:
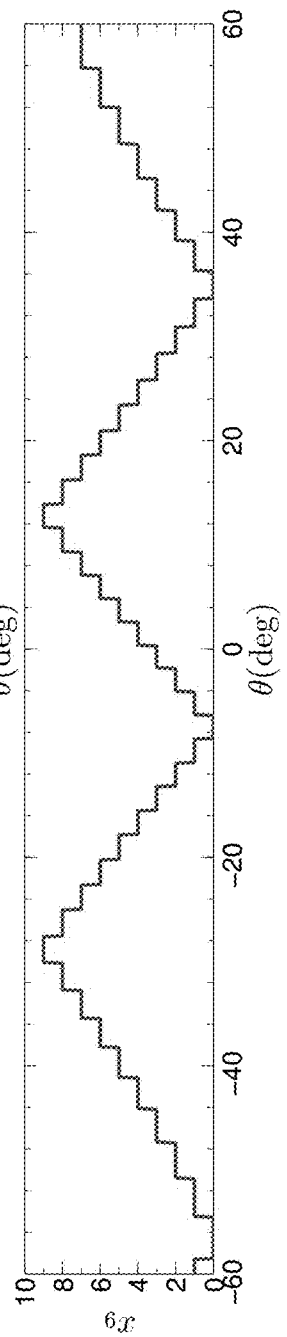
Figure 6A:
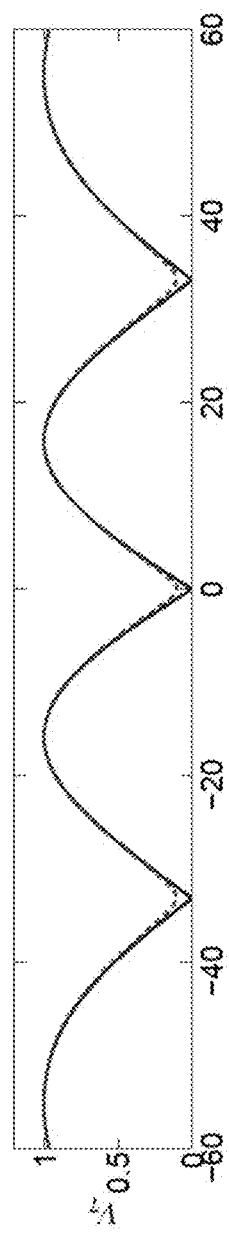
Figure 6B:
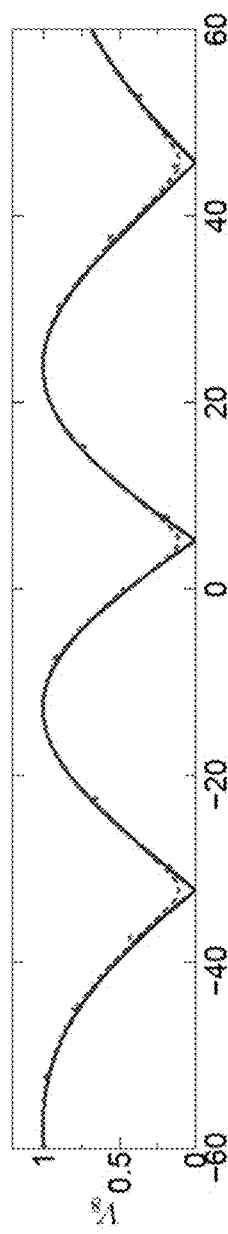
Figure 6C:
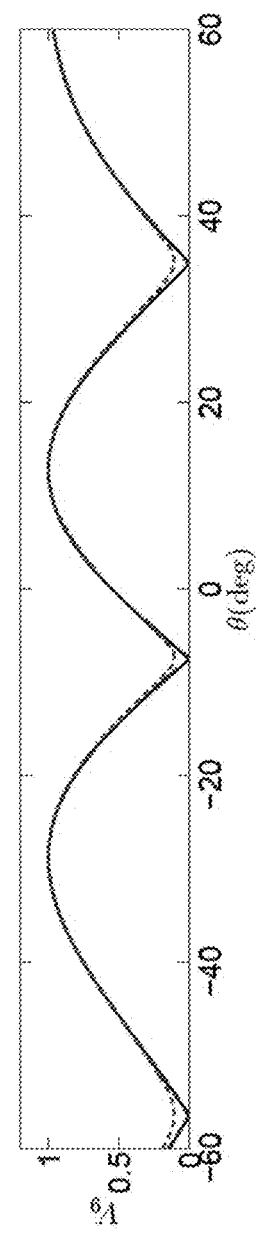
Figure 7A:
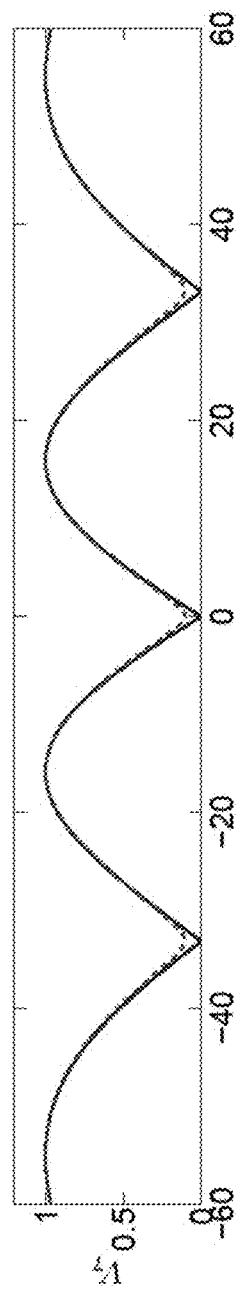
FIGS. 7A-7F illustrate simulation results for non-ideal components and SNR=20 dB, normalized envelope detector output in which the blue solid line represents the theoretical values, and the red dashed line represents the simulation results in accordance with one embodiment.
Figure 7B:
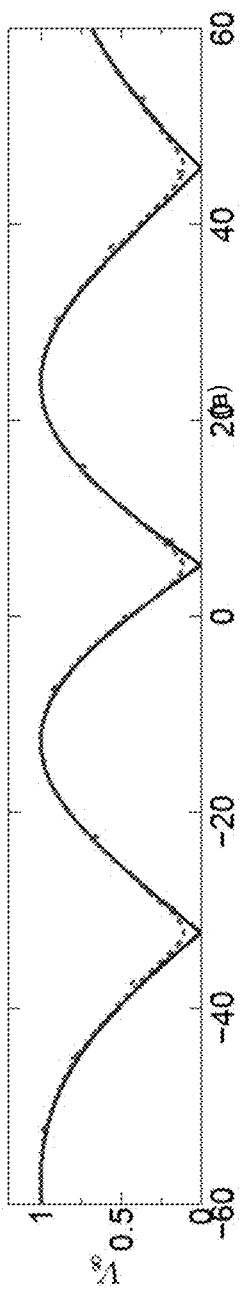
Figure 7C:
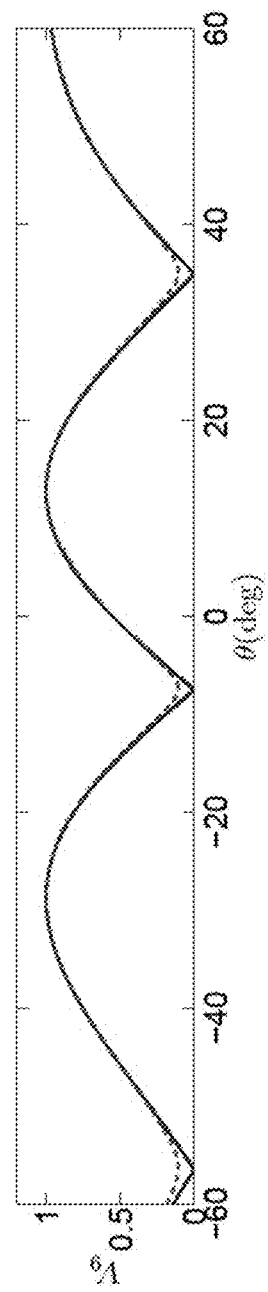
Figure 7D:
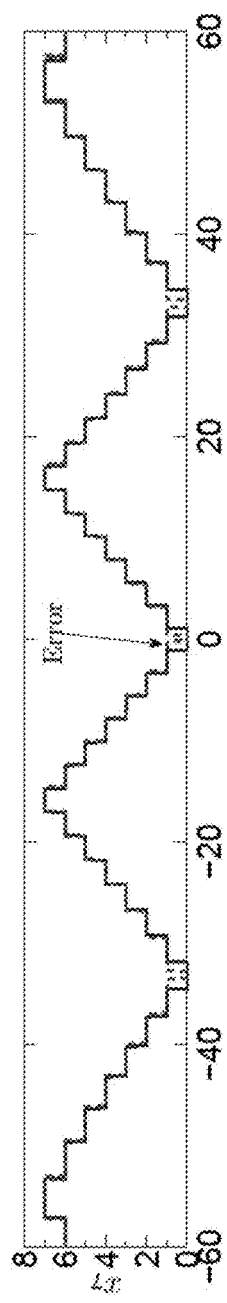
Figure 7E:
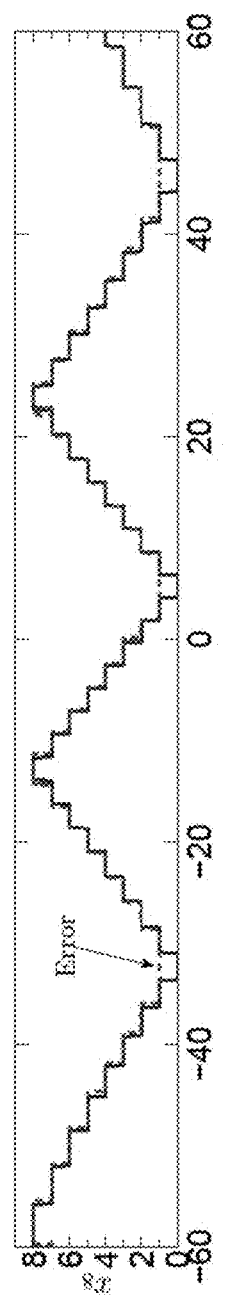
Figure 7F:
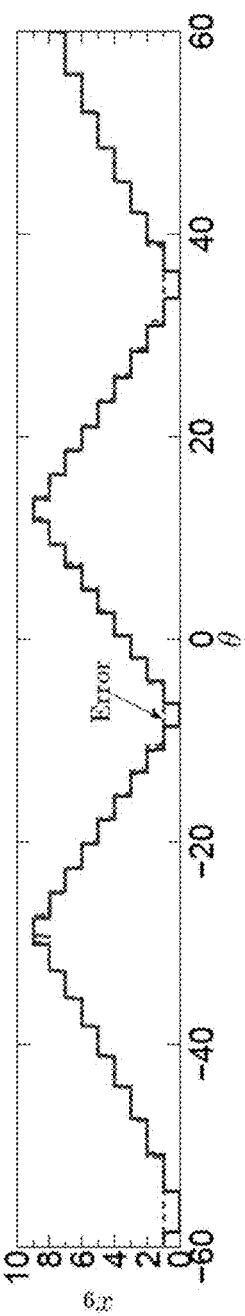

The phase shifts listed in Table 2 are applied to the signals received at each measurement antenna element to align the folding wave forms generated by the array with the normalized RSNS folding sequences shown in FIGS. 5A-5C.

| $m_i$ | 7 | 8 | 9 |
|---|---|---|---|
| $\phi_i$ (deg) | 0 | −52.5 | −293.33 |

Table 2. Required phase shifts to match folding wave forms to robust symmetrical number system's waveforms for $m_i=\{7, 8, 9\}$.

If the frequency of the incident RF wave is less than $f_{max}$, the folding waveforms will expand over a larger FOV. To determine the effect on the array transfer function, (24) is inserted into (8) and the wavelength is expressed as $\lambda=c/f$ to yield $$\psi_i = \xi \frac{\hat{M}f}{2m_i N f_{max}} \pi \sin(\theta). \quad (28)$$

The ratio, $f/f_{max}$, in (28) changes the scaling of the folding waveforms. Therefore, a new scaling factor, $$\tilde{\xi} = \xi \frac{f}{f_{max}} \quad (29)$$

is used to determine $\hat{\theta}_k$ in (26) and the corresponding angular resolution $r_k$ in (27). For example, if the array is designed for a FOV=120 deg at $f_{max}$=8 GHz and a signal with a frequency, f=6 GHz is received, the folding waveforms will expand as shown in FIGS. 6A-6F. The array's transfer function will also expand over a larger FOV reducing the angular resolution of the array.

Thus, as described above, first comparator network 460 generates robust symmetrical number system (RSNS) symmetrical residues of the first magnitude signal and outputs a first RSNS code to a first input to a RSNS to direction of arrival (DOA) converter 468. In one embodiment, first comparator network 460 utilizes a modulus of 7. Second comparator network 462 generates RSNS symmetrical residues of the second magnitude signal and outputs a second RSNS code to a second input to RSNS to DOA converter 468. In one embodiment, second comparator network 462 utilizes a modulus of 8. Third comparator network 464 generates RSNS symmetrical residues of the third magnitude signal and outputs a third RSNS code to a third input to RSNS to DOA converter 468. In one embodiment, third comparator network 464 utilizes a modulus of 9.

RSNS to DOA converter 468 decodes first, second, and third RSNS code inputs 472 in which each RSNS code is mapped to an unambiguous DOA determined in equation (26) and determines an output DOA 470 which is the direction of arrival of the RF signal. RSNS to COA converter 468 outputs the DOA of the RF signal to a display or other device.

Simulation of the photonic DF array with RSNS preprocessing displayed in FIG. 4 was conducted using RSOFT Design Group's OptSim software for the components up to and including the PDs. The front-end components, e.g., antennas, phase shifters, and LNAs, are simulated using phase shifted sinusoids with amplitude of 100 mV and a frequency of 2.4 GHz corrupted with additive white Gaussian noise (AWGN) as the electrical input signals applied to the DE-MZM electrodes.

The phase shifts ($\psi_i + \phi_i$) are based on each antenna's distance from the reference antenna and the phase shifts listed in Table 2 that are required to align the array's folding waveforms with the RSNS sequences in FIGS. 5A-5C. The optical source used in the simulation is a 1550 nm CW laser with a 20 mW power output. For the DE-MZMs, $V\pi$=2.6V.

The output data from the PDs is exported to MATLAB where the mean value is subtracted from each signal to simulate the DC blocking capacitor, and the signal's envelope is determined.

The signal at the envelope detector output is normalized and applied to a comparator network to determine the RSNS symmetrical residues. The simulation results are compared to the theoretical results obtained from $$V_i = \left| \sin\left(\frac{\psi_i}{2} + \varphi_i\right) \right| \quad (30)$$

where $\psi_i$ is defined by (8) and the values for $\phi_i$ are defined in Table 2.

Simulations were performed using non-ideal components and a signal environment corrupted by AWGN. An extinction ration of 25 dB and an insertion loss of 3 dB are used for the DE-MZMs. For the PDs, a dark current of 0.1 nA, quantum efficiency of 0.7, and a 20 GHz BW are specified. Also, electrical and quantum noise are included in the OptSim modeling. The maximum value of the envelope detector used in normalizing the output values for each channel was generated by using a separate identical channel with a constant phase shift of 180 deg from the reference signal in the simulation and averaging the value over time. Simulations were conducted for a Signal to Noise Ratio (SNR)=20 dB. The results for SNR=20 dB are discussed below.

The normalized envelope detector output voltage is plotted along with the theoretical folding waveforms in FIGS. 7A-7F. Due to the extinction ration of the DE-MZM and the addition of AWGN, the minimum value of the normalized envelope is greater than zero. The values of the symmetrical residues were determined by applying the normalized envelope detector's output value at each time instant to the comparator network. The residue values for 100 time instances were averaged and rounded to the nearest integer. Several errors occur in the resolved residues which are shown in FIGS. 7A-7F due to the signal level not decreasing below the comparator voltage for the value of 1. The errors in the residues are carried forward in the transfer function, presented in FIG. 8. From FIGS. 7A-7F, it is observed that the residue values do not match the theoretical values exactly; however, the overall stair case type waveform is preserved. The RSNS vector generated for each DOA is converted to a decimal bin number that is represented by a quantized DOA $\hat{\theta}_k$.

Figure 8:
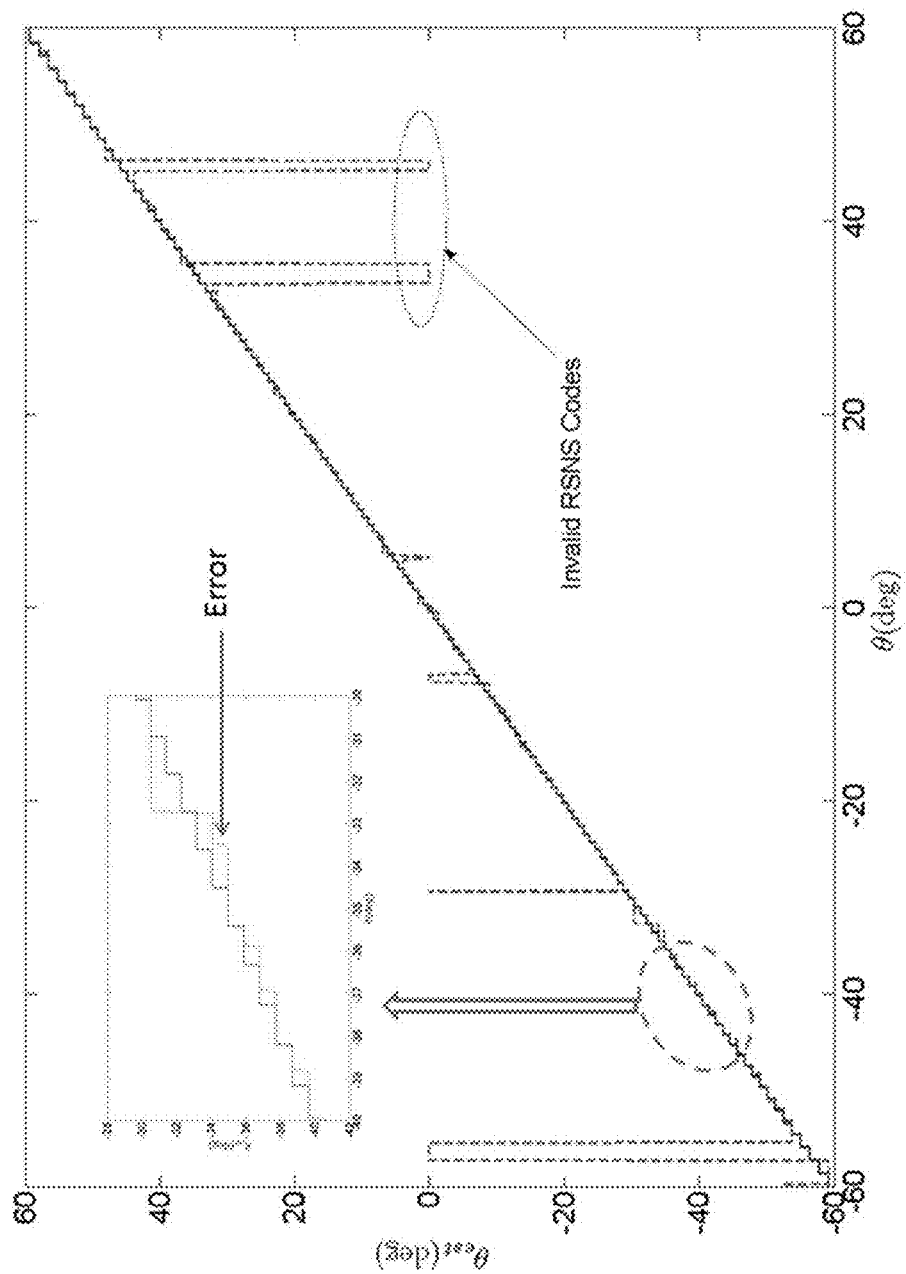
FIG. 8 illustrates the transfer function of photonic direction finding array with robust symmetrical number system preprocessing for SNR=20 dB in which the blue solid line is the theoretical transfer function and the red dashed line represents the simulation results in accordance with one embodiment.

The estimated DOA $\theta_{est}$ is plotted against the DOA $\theta$ in FIG. 8. The theoretical transfer function is also plotted in FIG. 8. The simulated curve shows six values that produce invalid RSNS codes for which the values of $\theta_{est}$ were set to zero degrees. The inset is provided to show the details in the curves and how the simulation closely approximates the theoretical transfer function. Examination of the inset around $\theta$=33 deg reveals an erroneous value for $\theta_{est}$. This error corresponds to the erroneous residue value in the folding waveform for the m=8 curve at 33 deg shown in FIGS. 7A-7F. These errors result in either invalid RSNS code values that were set to zero degrees or erroneous codes resulting in decoding errors.

Figure 9:
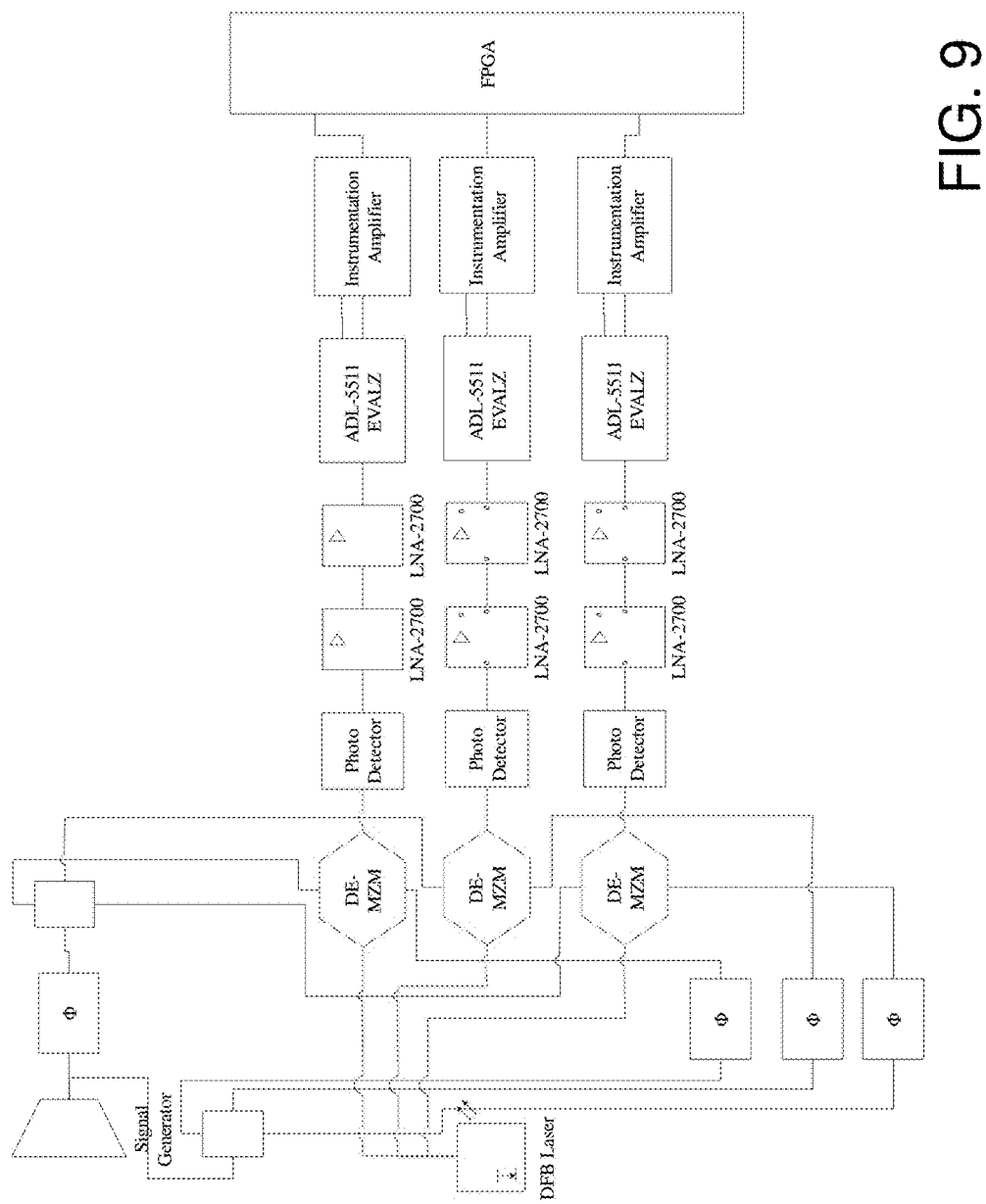
FIG. 9 illustrates a block diagram of an equipment setup for bench testing in accordance with one embodiment.

FIG. 9 shows a block diagram of an equipment set up for bench testing a photonic DF array with RSNS preprocessing in accordance with one embodiment of the invention. Narrow band testing was conducted to prove the concept due to the cost constraints imposed by wideband components, i.e., antennas, and LNAs. In one embodiment, a 2.4 GHz CW sinusoidal signal with a 6 dBm power level was provided by a HP 83711B synthesized CW generator. The CW signal was routed to electrode one of each DE-MZM and also to the input of each manual phase shifter used to generate the required phase shift for the signal received at electrode two of each DE-MZM (Fujitsu FTM9712ER). The optical source was a high power 1550 nm wavelength distributed feedback (DFB) laser at a constant power level of 60 mW.

The optical signal was split and routed to each DE-MAM where the optical signal's intensity was modulated by the voltage difference between the DE-MZM's electrodes. The modulated optical signal in each channel was detected and converted back to an electrical signal using high speed InGaAs PD (Newport Model 1014).

| $m_i$ | 7 | 8 | 9 |
|---|---|---|---|
| $\phi_i$ (deg) | −8.57 | −135 | −73.33 |

Table 3. Required phase shifts to match folding wave forms to robust symmetrical number system's waveforms for experimental testing.

The output of the PDs was passed through a DC blocking capacitor and then amplified using two cascaded LNAs (RF-BAY LNA-2700) prior to envelope detection using an Analog Devices envelope detector evaluation board (Analog Devices, ADL 5511-EVALZ). The envelope signal output $V_{env}$ is biased on a reference voltage $E_{ref}$ which is also available as an output. The true envelope was provided by subtracting $E_{ref}$ from $V_{env}$ using an instrumentation amplifier (INA 114) circuit.

The outputs of the instrumentation amplifiers were routed to an FPGA (National Instruments Virtex-5 LX30 Compact RIO Reconfigurable Chassis and NI cRIO 9012 Real time controller). The FPGA implemented a comparator network and a RSNS to binary algorithm. The FPGA outputs were the RSNS residue values and the DOA bin number which was converted to an angular value via a lookup table. The FPGA code used a left-shifted RSNS code with $m_i=\{7,8,9\}$ with a truncated code length of 131. To align the folding waveforms with the RSNS waveforms the phase shifts listed in Table 3 were inserted.

Manual phase shifters (Sage Laboratories Model 6708) were used to insert a phase shift between the sinusoidal signals applied at the two electrodes of each DE-MZM to simulate the phase shift $\psi_i$ that would be present for a given DOA. A rotational turn counter was attached to the shaft of each phase shifter to allow for repeatability of measurements. The phase shifters were calibrated using a VNA (HP 8517A S-parameter test set and HP 8510C Network Analyzer). The data points were curve fitted to a linear equation for each phase shifter. Due to the phase shifters providing only 180 degrees of phase shift at the signal frequency of 2.4 GHz and the symmetrical transfer function of the DE-MZMs, phase angles between 180 degrees and 360 degrees were simulated by inserting a phase shift of $360-\psi_i$.

Data was taken in 0.2 deg increments for −60 degrees≤θ≤+60 degrees. The residue values resulting in each channel were recorded and graphed against the expected residue values based on the theoretical predictions provided by (22) and (25). Examining FIGS. 10A-10C, the experimental results follow a staircase waveform similar to that of the theoretical predictions. There are several points where the transitions between values do not occur when expected or where the tread of the experimental staircase wave form is either wider or narrower than the theoretical curves. These errors are attributed to the drifting of the modulator bias point and the amplifier circuit's gain with temperature. Additionally, fluctuations in laser output power may have contributed to the errors.

Figure 11:
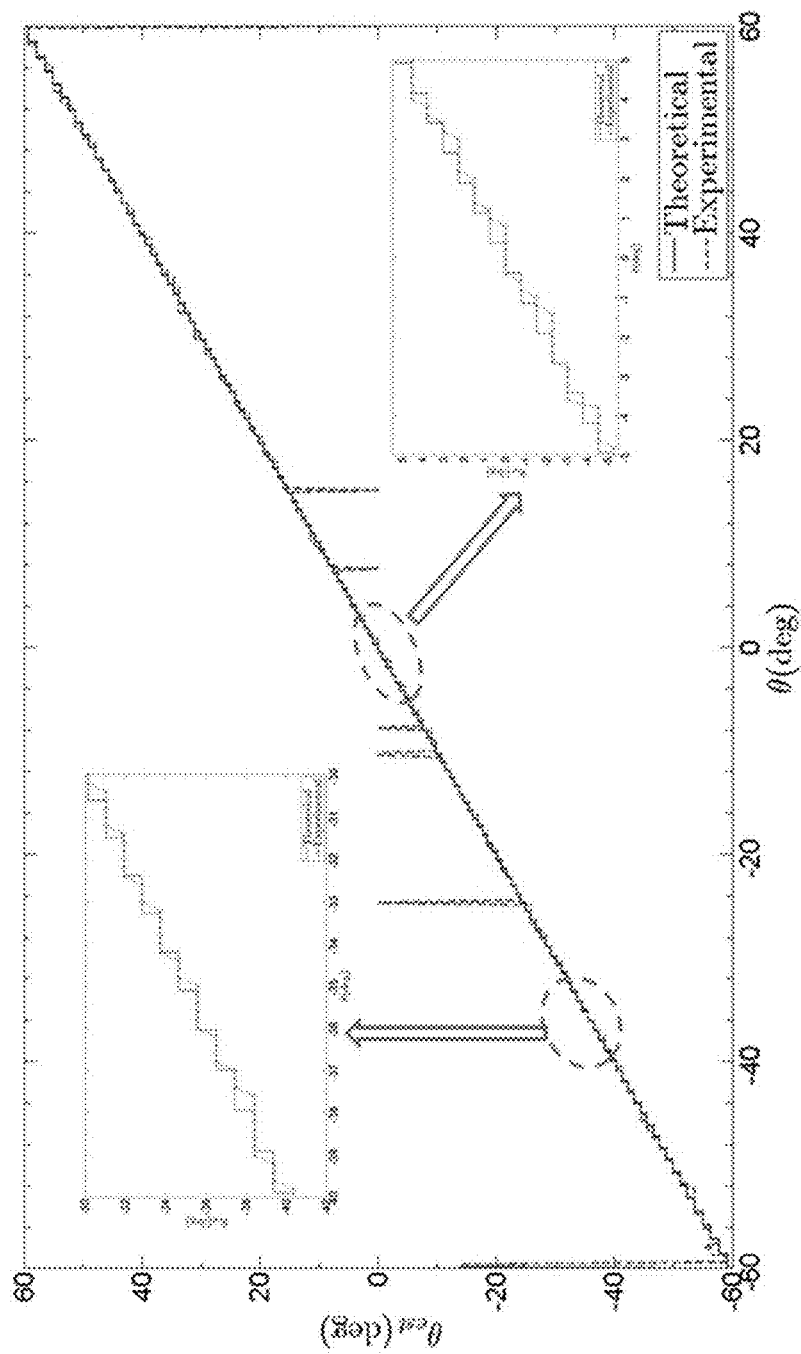
FIG. 11 illustrates a theoretical direction finding array transfer function versus experimental results in accordance with one embodiment.
Figure 12:
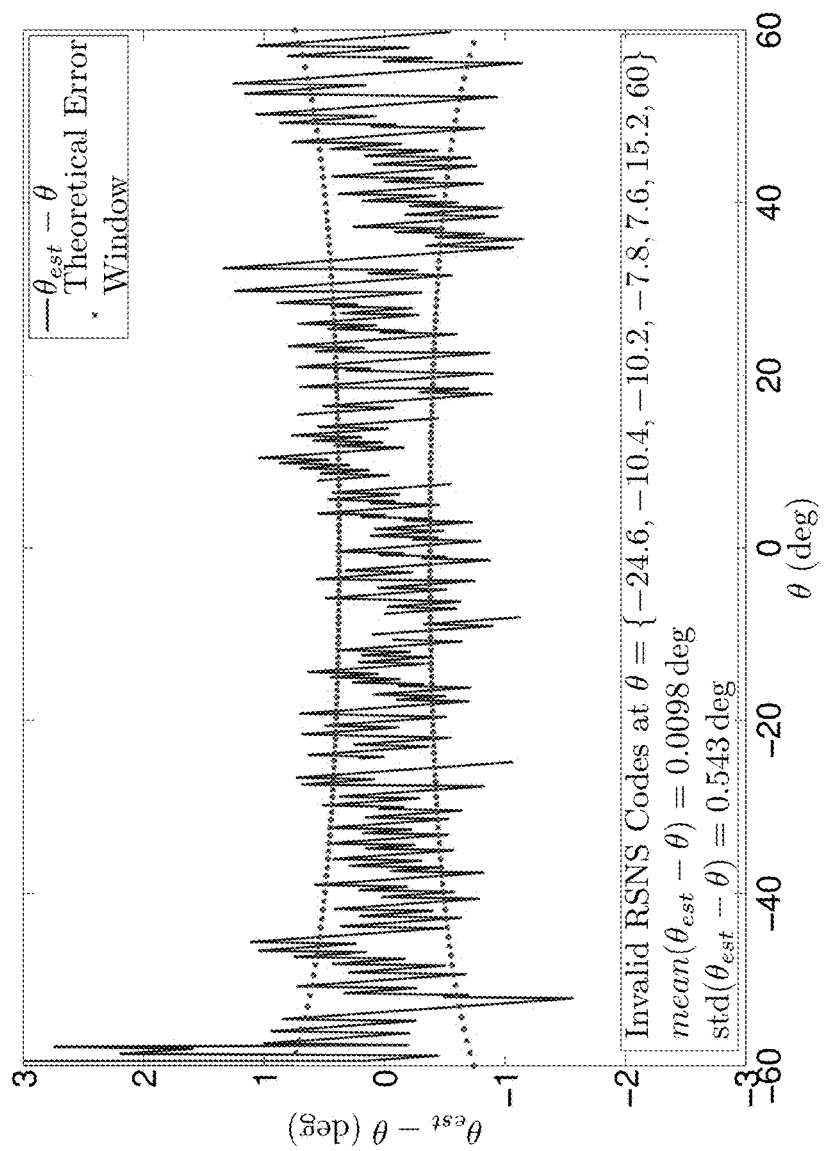
FIG. 12 illustrates experimental results $-\theta_{est}-\theta$ in which experimental data are represented by the solid blue line and the theoretical error envelope is represented by red dots in accordance with one embodiment.

The estimated DOA for each data point is plotted against the theoretical transfer function of the photonic DF array with RSNS preprocessing in FIG. 11. The experimental data approximates the theoretical transfer function. Some of the RSNS code results were invalid and were set to 0 deg. The detail of the curves are displayed in the insets of FIGS. 6A-6C where it can be seen that the experimental results follow the theoretical results, but the transitions between the DOA bins do not occur at the proper locations resulting in some DOA bins that are narrower or wider than the theoretical curve. The error signal, $(\theta_{est}-\theta)$, is displayed in FIG. 12. The mean value and standard deviation were determined for the error signal, neglecting the data appoints that resulted in invalid RSNS code vectors and the outlying values at θ={−59.8 deg−59.6 deg}. The errors in the experimental transfer functions results are attributed to either voltage drift of the modulator bias point and the amplifiers during the bench testing or variation in the output intensity of the DFB laser used. Another source of the errors is the difference in amplitude between the reference signal and the measurement signals due to unbalanced attenuation in the cables and phase shifter. Use of a DE-MZM bias control circuit and amplifiers with increased stability and/or adaptive gain features should allow for more stable system performance. Errors may also be reduced through oversampling and integration.

Figure 13:
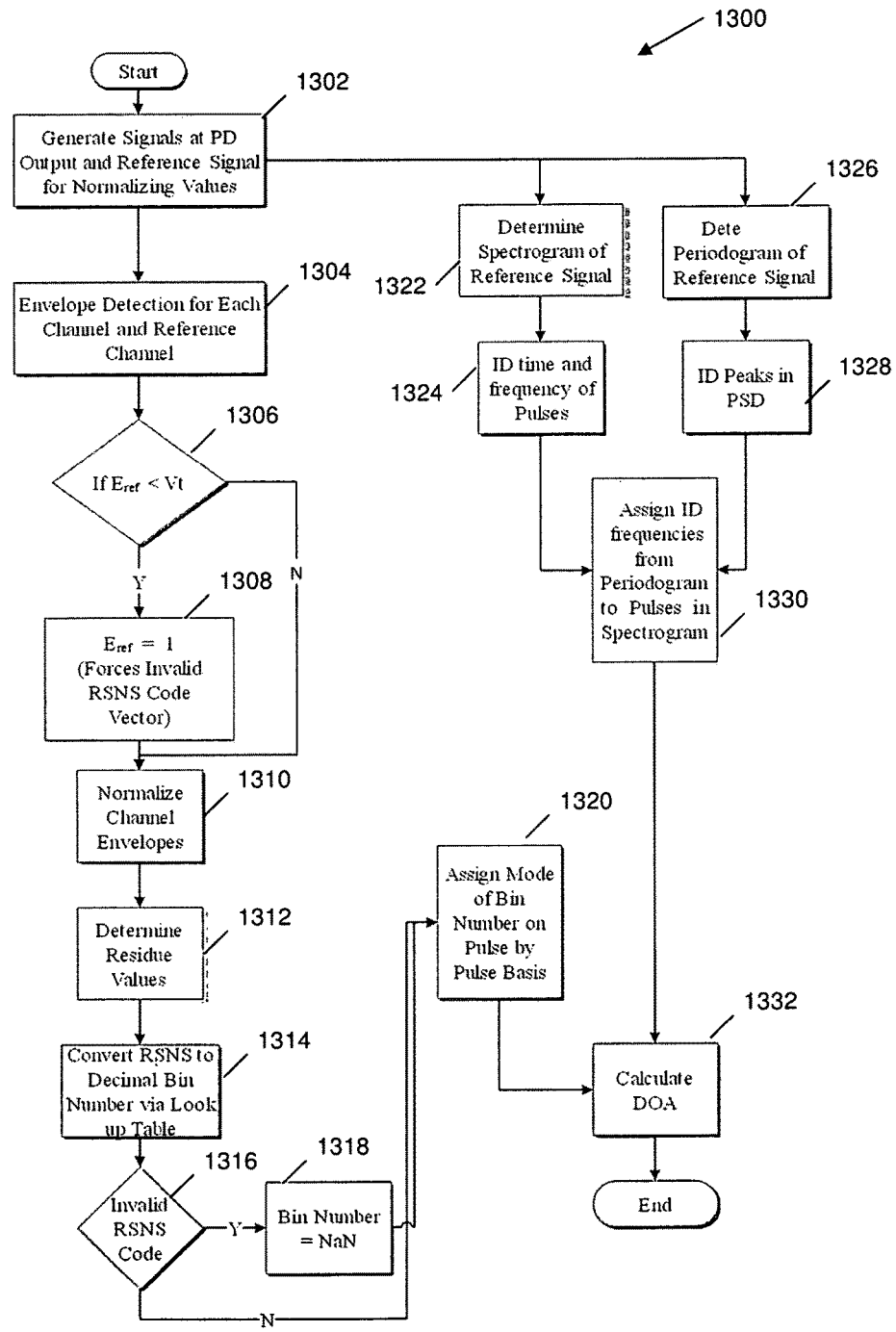
FIG. 13 illustrates a simulation process flow chart for multiple emitter direction of arrival determination in accordance with one embodiment.

To further demonstrate the performance of the photonic DF array with RSNS preprocessing, simulations were conducted in MATLAB. The simulation flow chart 1300 including operations 1302-1332 is shown n FIG. 13. A signal consisting of two pulsed sinusoidal signals was simulated at the output of each PD based on the theoretical results earlier presented. The carrier frequencies of the signals were in the MHz range to limit the computer resources required to conduct the simulations over a timeframe of several milliseconds. The design frequency for the array in the simulations is 100 MHz.

The reference antenna signal was processed separately to determine $f_c$ that applies to each DOA pulse through examination of the periodogram and spectrogram. The periodogram was produced using the Welch method employing a Hamming window, a 2048 point FTT, and a 50 percent overlap. The spectrogram was determined using a 2048 point FFT with Hamming window and 75 percent overlap. A hard threshold equal to twenty times the median value was applied to the power spectrum represented by the spectrogram to determine the frequency of the pulses and the time values corresponding to the pulses. The results were applied to the decimal values corresponding to the RSNS vectors after the mode function was applied to select the value that occurs most frequently in the samples that are contained within each pulse. An example is shown below to demonstrate the performance of the photonic array and the processing of two pulsed emitters. The example examines a two emitter case whose parameters are listed in Table 4.

TABLE 4

Multiple pulsed emitters-example: signal parameters.

| Emitter | PRF (kHz) | PW (μs) | $f_c$ (MHz) | DOA (deg) |
|---|---|---|---|---|
| 1 | 8 | 6 | 60.2 | 30 |
| 2 | 7 | 8 | 29.1 | −10 |

Figure 14A:
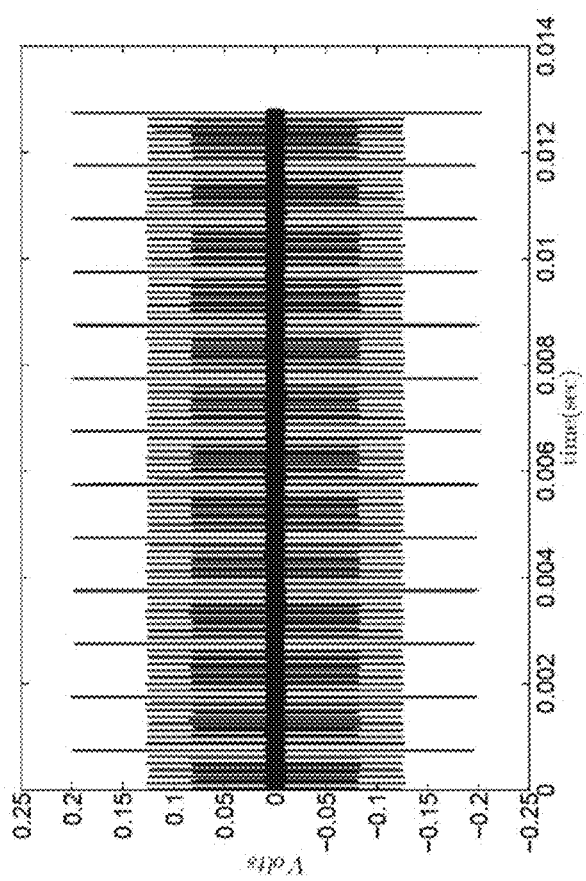
FIG. 14A illustrates a multiple pulsed signals example of an input signal in accordance with one embodiment.
Figure 14B:
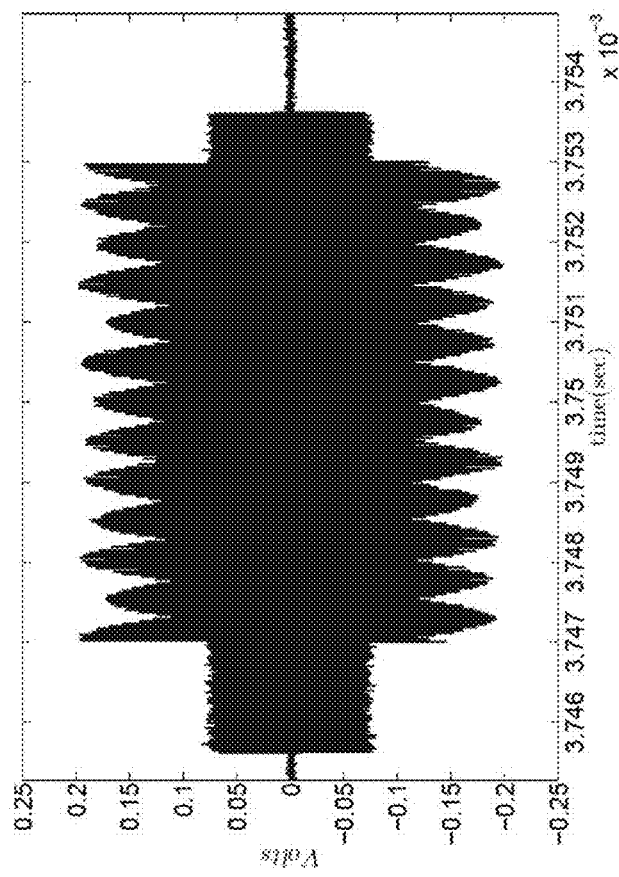
FIG. 14B illustrates a multiple pulsed signals example of an interference of pulses in accordance with one embodiment.

A graphical representation of the input signal is shown in FIG. 14A. An example of the interference that occurs when two pulses are received simultaneously is shown in FIG. 14B.

Figure 15A:
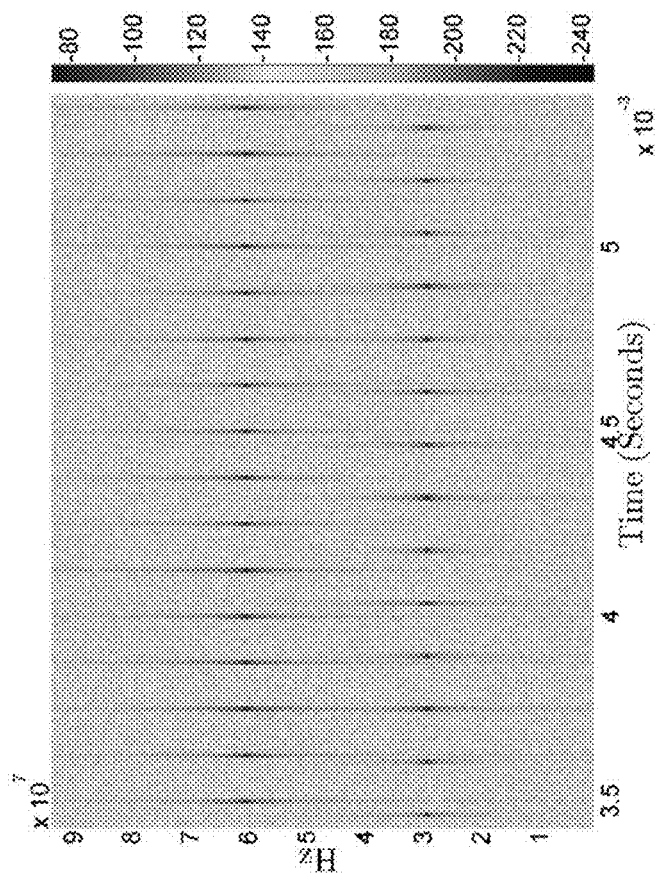
FIG. 15A illustrates a spectrogram of two pulsed sinusoidal signals, for example $PRF_1=8$ kHz, $PW_1=6$ μs, $f_{c1}=60.2$ MHz, $PRF_2=7$ kHz, $PW_2=8$ μs, $f_{c2}=29.1$ MHz in accordance with one embodiment.
Figure 15B:
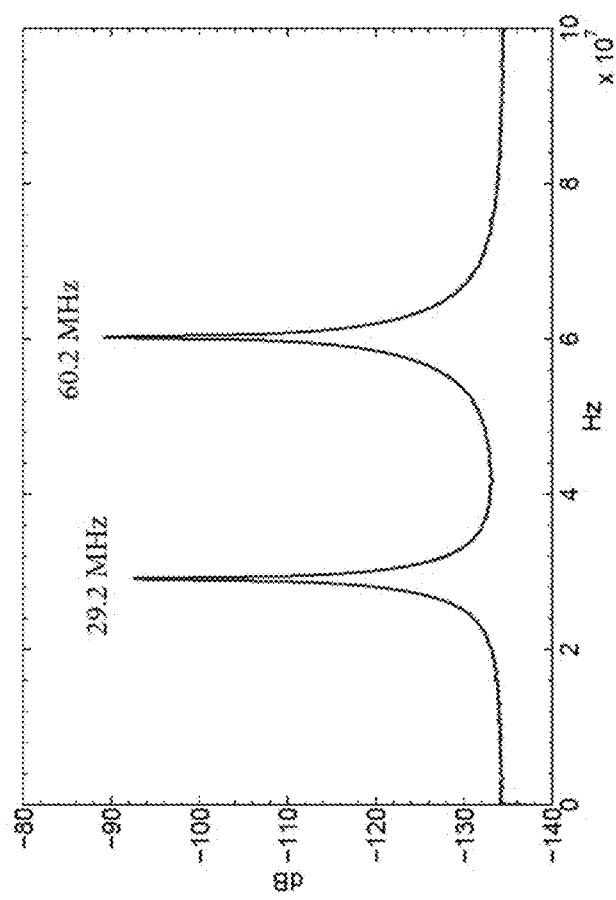
FIG. 15B illustrates a periodogram of input signal using Welch method with 2048 point FFT, 50 percent overlap and Hamming window, μ for example $PRF_1=8$ kHz, $PW_1=6$ μs, $f_{c1}=60.2$ MHz, $PRF_2=7$ kHz, $PW_2=8$ μs, $f_{c2}=29.1$ MHz in accordance with one embodiment.

The carrier frequencies of the two pulsed sinusoids were determined from the periodogram of the signal using the Welch method. The spectrogram of the signal was also used to determine the location of the pulses in a time-frequency representation. The spectrogram and periodogram are displayed in FIGS. 15A and 15B for $PRF_1$=8 kHz, $PW_1$=6 μs, $f_{c1}$=60.2 MHz, $PRF_2$=7 kHz, $PW_2$=8 μs, $f_{c2}$=29.1 MHz. FIG. 15A illustrates the spectrogram of the two pulsed sinusoidal signals. FIG. 15B illustrates the periodogram of input signal using Welch method with 2048 point FFT, 50 percent overlap and Hamming window.

From the periodogram shown in FIG. 15B, the carrier frequencies of the two pulsed waveforms were estimated to be equal 60.2 MHz and 29.2 MHz. From the spectrogram data, the time sequences corresponding to the received pulses and their frequencies were applied to (29) and (26) to determine the DOA versus time plot. An estimate of the PW and PRF can be obtained from the spectrogram; however, more accurate algorithms exist based on TOA data. From the spectrogram shown in FIG. 15A, the PRF for emitter number one is estimated to be 8 kHz, and from emitter number two the PRF is estimated to be 7 kHz.

Figure 16A:
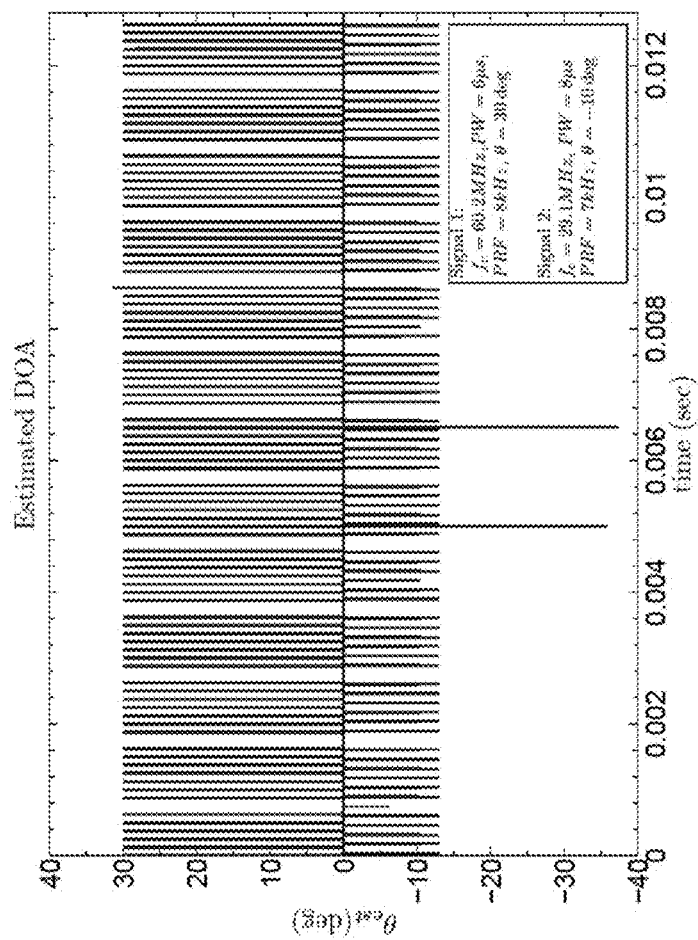
FIG. 16A illustrates direction of arrival versus time for a multiple pulsed signal example of two pulsed signals, one with a DOA of 30 degrees and one with a DOA of −10 degrees in accordance with one embodiment.
Figure 16B:
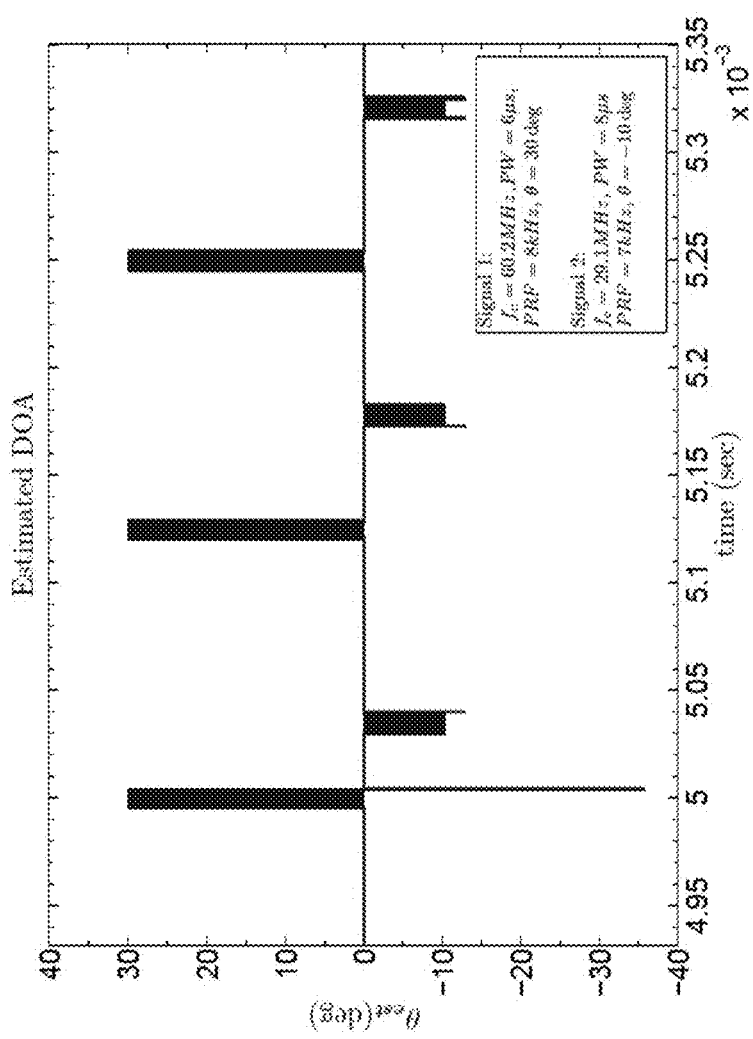
FIG. 16B illustrates a magnified view of FIG. 16A in accordance with one embodiment.

The resulting DOA versus time plots are displayed in FIGS. 16A-16C. in order to resolve the DOA for each pulse and remove errors associated with noise or invalid RSNS codes, the mode function that selects the value that occurs most often in the set of data was applied to the decimal value representing the decoded RSNS vector within the spectrogram time slots corresponding to each pulse. From the results in FIGS. 16A-16C, the estimated DAO for each pulse is approximately equal to the DOA of the transmitted signals.

The simulations and experimental testing discussed above demonstrate the performance of the photonic DF array with RSNS preprocessing when receiving a narrow band CW signal. As discussed earlier, DE-MZMs have BWs on the order of 40 GHz. This allows the intercept of signals over a large BW, for example 2-10 GHz, without the requirement to down-convert the signal or channelize the signals. The DF antenna spacing is based on the maximum design frequency. If the frequency of the intercepted signal is less than the maximum design frequency, the folding waveforms expand changing the DOA mapping of the RSNS vectors and reducing the angular resolution of the array. Therefore, the frequency of each received pulse must be determined and used in the array signal processing to calculate the DOA. Also, if more than one emitter is present, some pulses will interfere with each other causing errors in RSNS residues and subsequently either invalid RSNS codes or erroneous values for the estimated DOA.

As described herein embodiments in accordance with the invention provide a four-element photonic DF array with RSNS preprocessing which utilize DE-MZMs. Embodiments in accordance with the method utilize DE-MZMs in a phase interferometry application and use RSNS preprocessing in a linear array design to provide a small baseline DF linear array while achieving a wide FOV and fine angular resolution. The photonic DF array with RSNS preprocessing can monitor a wide BW to determine the DOA of pulsed emitters.

In alternate embodiments, the components used in the exemplary design described herein can be modified to used wideband antennas and amplifier circuits. Also, in some embodiments, adaptive gain amplifiers can be used to ensure the signals applied to the DE-MZM electrodes are of equal amplitude allowing for simpler normalization and comparator level assignment. Further, in some embodiments a bias control circuit for the DE-MZMs can be used to compensate for temperature drift of the DE-MZM bias points. In some embodiments, at high frequencies in which there is a comparatively large footprint of wideband spiral antennas, the array of antennas may require staggering in height. In some embodiment, in which a DC component is not present in the outputs of the PDs, the DC BLK elements can be eliminated or by-passed.

This disclosure provides exemplary embodiments of the invention. The scope of the invention is not limited by these exemplary embodiments. Numerous variations, whether explicitly provided for by the specification or implied by the specification or not, may be implemented by one of skill in the art in view of this disclosure.

What is claimed is:

1. A system for robust symmetrical number system photonic direction finding comprising:

a reference antenna for receiving an input RF signal, wherein said reference antenna is connected to a first input to a first low noise amplifier (LNA), and to an input to an automatic gain control module (AGC);

a first measurement antenna element for receiving a first RF signal, wherein said first RF signal is an identical phase shifted signal of said RF signal, further wherein said first measurement antenna element is separated from said reference antenna a distance $d_1$, said first measurement antenna element connected to an input to a first phase shifter;

said first phase shifter for shifting a phase of said first RF signal by a phase shift of $\psi_1$, said first phase shifter connected to a first input to a second LNA;

a second measurement antenna element for receiving a second RF signal, wherein said second RF signal is an identical phase shifted signal of said RF signal, further wherein said second measurement antenna element is separated from said reference antenna a distance $d_2$, said second measurement antenna element connected to an input to a second phase shifter;

said second phase shifter for shifting a phase of said second RF signal by a phase shift of $\psi_2$, said second phase shifter connected to a first input to a third LNA;

a third measurement antenna element for receiving a third RF signal, wherein said third RF signal is an identical phase shifted signal of said RF signal, further wherein said third measurement antenna element is separated from said reference antenna a distance $d_3$, said third measurement antenna element connected to a an input to a third phase shifter;

said third phase shifter for shifting a phase of said third RF signal by a phase shift of $\psi_3$, said third phase shifter connected to a first input to a fourth LNA;

said AGC, wherein an output of said AGC is connected to a second input to each of said first LNA, said second LNA, said third LNA, and said fourth LNA;

said first LNA connected to a first electrode input to each of a first dual electrode Mach-Zehnder modulator (DE-MZM), a second DE-MZM, and a third DE-MZM;

said second LNA connected to a second electrode input to said first DE-MZM;

said third LNA connected to a second electrode input to said second DE-MZM;

said fourth LNA connected to a second electrode input to said third DE-MZM;

a continuous wave (CW) laser for generating an optical signal, wherein an output of said CW laser is connected to an input to a 3:1 optical splitter;

said 3:1 optical splitter, wherein a first output of said 3:1 optical splitter is connected to an optical input to said first DE-MZM, a second output of said 3:1 optical splitter is connected to an optical input to said second DE-MZM, and a third output of said 3:1 optical splitter is connected to an optical input to said third DE-MZM;

said first DE-MZM, wherein an output of said first DE-MZM is connected to an input to a first photodetector (PD);

said second DE-MZM, wherein an output of said second DE-MZM is connected to an input to a second PD;

said third DE-MZM, wherein an output of said third DE-MZM is connected to an input to a third PD;

said first PD, wherein an output of said first PD is connected to an input to a first direct current blocking capacitor (DC BLK);

said second PD, wherein an output of said second PD is connected to an input to a second DC BLK;

said third PD, wherein an output of said third PD is connected to an input to a third DC BLK;

said first DC BLK, wherein an output of said first CD BLK is connected to an input to first envelope detection and normalizing (ENV) module;

said second DC BLK, wherein an output of said second DC BLK is connected to an input to a second ENV module;

said third DC BLK, wherein an output of said third DC BLK is connected to an input to a third ENV module;

said first ENV module, wherein an output of said first ENV module is connected to an input to a first comparator network;

said second ENV, wherein an output of said second ENV module is connected to an input to a second comparator network;

said third ENV module, wherein an output of said third ENV module is connected to an input to a third comparator network;

said first comparator network, wherein an output of said first comparator network is connected to an input to a robust symmetrical number system (RSNS) to direction of arrival (DOA) converter;

said second comparator network, wherein an output of said second comparator network is connected to an input to said RSNS to DOA converter;

said third comparator network, wherein an output of said third comparator network is connected to an input to said RSNS to DOA converter; and said RSNS to DOA converter, wherein said RSNS to DOA converter includes an output for outputting a generated DOA.

2. The system of claim 1 wherein said CW laser is a 1550 nm CW laser.

3. A method for robust symmetrical number system photonic direction finding comprising:

receiving an RF signal at a reference antenna;

receiving a first RF signal at a first measurement antenna element, said first RF signal is shifted in phase from said RF signal, wherein said first measurement antenna element is separated from said reference antenna a distance $d_1$;

outputting said first RF signal to a first phase shifter;

phase shifting said first RF signal by a phase shift $\psi_1$ to generate a first phase shifted signal;

receiving a second RF signal at a second measurement antenna element, said second RF signal shifted in phase from said RF signal, wherein said second measurement antenna element is separated from said reference antenna a distance $d_2$;

outputting said second RF signal to a second phase shifter;

phase shifting said second RF signal by a phase shift $\psi_2$ to generate a second phase shifted signal;

receiving a third RF signal at a third measurement antenna element, said third RF signal shifted in phase from said RF signal, wherein said third measurement antenna element is separated from said reference antenna a distance $d_3$;

outputting said third RF signal to a third phase shifter;

phase shifting said third RF signal by a phase shift $\psi_3$ to generate a third phase shifted signal;

outputting said RF signal from said reference antenna to first input to a first low noise amplifier (LNA) and to a first input to an automatic gain control module (AGC);

outputting said first phase shifted signal from said first phase shifter element to a first input to a second LNA;

outputting said second phase shifted signal from said second phase shifter element to a first input to a third LNA;

outputting said third phase shifted signal from said third phase shifter element to a first input to a fourth LNA;

applying automatic gain control to said RF signal at said AGC and outputting an AGC modified RF signal from said AGC to a second input to each of said first LNA, said second LNA, said third LNA, and said fourth LNA;

amplifying said RF signal at said first LNA, and outputting an amplified RF signal from said first LNA to a signal splitter;

splitting said amplified RF signal into three signals and outputting said amplified RF signal from said splitter to a first electrode of each of a first dual electrode Mach-Zehnder modulator (DE-MZM), a second DE-MZM, and a third DE-MZM;

amplifying said first phase shifted signal at said second LNA, and outputting an amplified first phase shifted RF signal from said second LNA to a second electrode to said first DE-MZM;

amplifying said second phase shifted signal at said third LNA, and outputting an amplified second phase shifted RF signal from said third LNA to a second electrode to said second DE-MZM;

amplifying said third phase shifted RF signal at said fourth LNA, and outputting an amplified third phase shifted RF signal from said fourth LNA, to a second electrode to said third DE-MZM;

generating an optical signal at a continuous wave (CW) laser;

outputting said optical signal from said CW laser to 3:1 optical splitter;

splitting said optical signal into three optical signals and outputting said optical signals from said optical splitter to an optical input to each of said first DE-MZM, said second DE-MZM, and said third DE-MZM;

modulating an amplitude of said optical signal by said first DE-MZM to generate a first modulated optical signal that is a function of a phase difference between said amplified RF signal and said amplified first phase shifted RF signal applied to said electrodes of said first DE-MZM, and outputting said first modulated optical signal from said first DE-MZM to a first photodetector (PD);

modulating an amplitude of said optical signal by said second DE-MZM to generate a second modulated optical signal that is a function of a phase difference between said amplified RF signal and said amplified second phase shifted RF signal applied to said electrodes of said second DE-MZM, and outputting said second modulated optical signal from said second DE-MZM to a second PD;

modulating an amplitude of said optical signal by said third DE-MZM to generate a third modulated optical signal that is a function of a phase difference between said amplified RF signal and said amplified third phase shifted RF signal applied to said electrodes of said second DE-MZM, and outputting said third modulated optical signal from said third DE-MZM to a third PD;

converting said first modulated optical signal by said first PD to a first electrical signal, and outputting said first electrical signal to a first direct current blocking capacitor (DC BLK);

converting said second modulated optical signal by said second PD to produce a second electrical signal, and outputting said second electrical signal to a second DC BLK;

converting said third modulated optical signal by said third PD to produce a third electrical signal, and outputting said third electrical signal to a third DC BLK;

blocking a DC component of said first electrical signal by said first DC BLK to generate a first sinusoidal signal, and outputting said first sinusoidal signal to a first envelope detection and normalizing (ENV) module;

blocking a DC component of said second electrical signal by said second DC BLK to generate a second sinusoidal signal, and outputting said second sinusoidal signal to a second ENV module;

blocking a DC component of said third electrical signal by said third DC BLK to generate a third sinusoidal signal, and outputting said third sinusoidal signal to a third ENV module;

converting said first sinusoidal signal by said first ENV module to a first magnitude signal, and outputting said first magnitude signal to a first comparator network;

converting said second sinusoidal signal by said second ENV module to a second magnitude signal, and outputting said second magnitude signal to a second comparator network;

converting said third sinusoidal signal by said third ENV module to a third magnitude signal, and outputting said third magnitude signal to a third comparator network;

generating first RSNS code residues of a magnitude of said first magnitude signal by said first comparator network and outputting said first RSNS code residues to a first input of a robust symmetrical number system (RSNS) to direction of arrival (DOA) converter;

generating second RSNS code residues of a magnitude of said second magnitude signal by said second comparator network and outputting said second RSNS code residues to a second input of said RSNS to DOA converter;

generating third RSNS code residues of a magnitude of said third magnitude signal by said third comparator network and outputting said third RSNS code residues to a third input of said RSNS to DOA converter;

decoding a direction of arrival (DOA) of said RF signal based on said first, second, and third RSNS code residues by said RSNS to DOA converter; and outputting said DOA of said RF signal.

4. The method of claim 3 wherein said amplitude of said optical signal is modulated by said first DE-MZM an amount equal to $|\sin(\phi/2)|$ where $\phi$ is a phase difference between the plane waves of said RF signal arriving at said reference antenna and said first RF signal arriving at said first measurement antenna element.

5. The method of claim 4 wherein said amplitude of said optical signal is modulated by said second DE-MZM an amount equal to $|\sin(\phi/2)|$ where $\phi$ is a phase difference between the plane waves of said RF signal arriving at said reference antenna and said second RF signal arriving at said second measurement antenna element.

6. The method of claim 5 wherein said amplitude of said optical signal is modulated by said third DE-MZM an amount equal to $|\sin(\phi/2)|$ where $\phi$ is a phase difference between the plane waves of said RF signal arriving at said reference antenna and said third RF signal arriving at said third measurement antenna element.

7. The method of claim 3 wherein said CW laser is a 1550 nm CW laser.

* * * * *